(12) United States Patent
Duerksen et al.

(10) Patent No.: US 10,959,374 B2
(45) Date of Patent: Mar. 30, 2021

(54) FLEXIBLE HEADER WITH SECTIONAL HEIGHT ADJUSTMENT

(71) Applicant: AGCO Corporation, Duluth, GA (US)

(72) Inventors: Chelan Dearic Duerksen, Hillsboro, KS (US); Derek Paul Buman, Halstead, KS (US)

(73) Assignee: AGCO Corporation, Duluth, GA (US)

( * ) Notice: Subject to any disclaimer, the term of this patent is extended or adjusted under 35 U.S.C. 154(b) by 0 days.

(21) Appl. No.: 16/770,915

(22) PCT Filed: Oct. 11, 2018

(86) PCT No.: PCT/IB2018/057892
§ 371 (c)(1),
(2) Date: Jun. 8, 2020

(87) PCT Pub. No.: WO2019/111069
PCT Pub. Date: Jun. 13, 2019

(65) Prior Publication Data
US 2020/0375107 A1 Dec. 3, 2020

Related U.S. Application Data

(60) Provisional application No. 62/596,646, filed on Dec. 8, 2017.

(51) Int. Cl.
*A01D 41/14* (2006.01)
*A01D 57/20* (2006.01)
(Continued)

(52) U.S. Cl.
CPC ............ *A01D 41/141* (2013.01); *A01D 57/20* (2013.01); *A01D 34/04* (2013.01); *A01D 41/127* (2013.01); *A01D 41/145* (2013.01)

(58) Field of Classification Search
CPC ..... A01D 41/141; A01D 57/20; A01D 41/145; A01D 41/127; A01D 34/04
See application file for complete search history.

(56) References Cited

U.S. PATENT DOCUMENTS 4,199,925 A 4/1980 Harris et al.
4,332,126 A * 6/1982 Van Auwelaer ..... A01D 41/141
56/10.2 R (Continued)

FOREIGN PATENT DOCUMENTS

EP 1 867 228 A1 12/2007
WO 2009/136265 A1 11/2009

OTHER PUBLICATIONS

UK Intellectual Property Office, Search Report for related UK Application No. GB 1800157.8, dated Jul. 4, 2018.

(Continued)

*Primary Examiner* — Arpad Fabian-Kovacs

(57) ABSTRACT

A flexible harvesting header (40) having multiple sections supported by support arms (74), with the height of each arm being adjustable in response to a changing load. Load sensors (504) at first ends of the arms sense loads and generate electronic load signals. Hydraulic cylinders (80) at second ends of the arms are actuatable to raise and lower the first ends. A controller receives the load signals, determines whether actuating one or more of the hydraulic cylinders (80) is warranted due to a changing load, and if so, changes a hydraulic pressure to raise or lower the first ends to offset the changing load. Actuation may be warranted if the changing load exceeds a predetermined value. Further, the entire flexible cutter bar (68) may be raiseable in response to an electronic raise signal, and the controller may actuate all of the hydraulic cylinders (80) to raise the front ends of all of the support arms (74).

20 Claims, 32 Drawing Sheets

(51) Int. Cl.
*A01D 41/127* (2006.01)
*A01D 34/04* (2006.01)

(56) References Cited

U.S. PATENT DOCUMENTS

| | | | | |
|---|---|---|---|---|
| 4,573,308 A * | 3/1986 | Ehrecke | | A01D 41/14 56/14.4 |
| 4,776,153 A * | 10/1988 | Depauw | | A01D 41/145 56/10.2 E |
| 4,942,724 A | 7/1990 | Diekhans et al. | | |
| 6,871,483 B1 * | 3/2005 | Panoushek | | A01D 41/141 56/10.2 E |
| 7,805,921 B2 * | 10/2010 | Coers | | A01D 41/141 56/364 |
| 10,462,968 B2 * | 11/2019 | Shearer | | A01D 57/20 |
| 2006/0242935 A1 * | 11/2006 | Rayfield | | A01D 41/141 56/10.2 E |
| 2007/0193243 A1 | 8/2007 | Schmidt et al. | | |
| 2007/0204584 A1 * | 9/2007 | Coers | | A01D 41/14 56/15.8 |
| 2007/0204585 A1 * | 9/2007 | Lovett | | A01D 61/002 56/15.8 |
| 2008/0078155 A1 * | 4/2008 | Coers | | A01D 41/141 56/15.8 |
| 2008/0271426 A1 * | 11/2008 | Lohrentz | | A01D 41/14 56/153 |
| 2008/0276590 A1 * | 11/2008 | Sauerwein | | A01D 41/14 56/153 |
| 2009/0007533 A1 * | 1/2009 | Lovett | | A01D 61/002 56/14.5 |
| 2009/0107094 A1 * | 4/2009 | Bich | | A01D 41/141 56/10.2 E |
| 2009/0277144 A1 * | 11/2009 | Honas | | A01D 41/14 56/153 |
| 2009/0277145 A1 * | 11/2009 | Sauerwein | | A01D 41/141 56/208 |
| 2009/0277146 A1 * | 11/2009 | Sauerwein | | A01D 34/13 56/208 |
| 2009/0277147 A1 * | 11/2009 | Honas | | A01D 57/20 56/208 |
| 2009/0277148 A1 * | 11/2009 | Sethi | | A01D 57/20 56/208 |
| 2009/0288383 A1 * | 11/2009 | Sauerwein | | A01D 57/20 56/181 |
| 2009/0293441 A1 * | 12/2009 | Sauerwein | | A01D 41/14 56/208 |
| 2010/0037582 A1 | 2/2010 | Sauerwein | | |
| 2015/0033692 A1 * | 2/2015 | Schroeder | | A01D 41/141 56/10.2 E |
| 2017/0359955 A1 * | 12/2017 | Dunn | | A01D 41/141 |
| 2018/0070531 A1 * | 3/2018 | Long | | A01D 34/006 |
| 2018/0153102 A1 * | 6/2018 | Dunn | | A01D 41/127 |
| 2018/0168101 A1 * | 6/2018 | Fuchtling | | A01D 34/04 |

OTHER PUBLICATIONS

European Patent Office, International Search report for International Application No. PCT/IB2018/057892, dated Jan. 15, 2019.

* cited by examiner

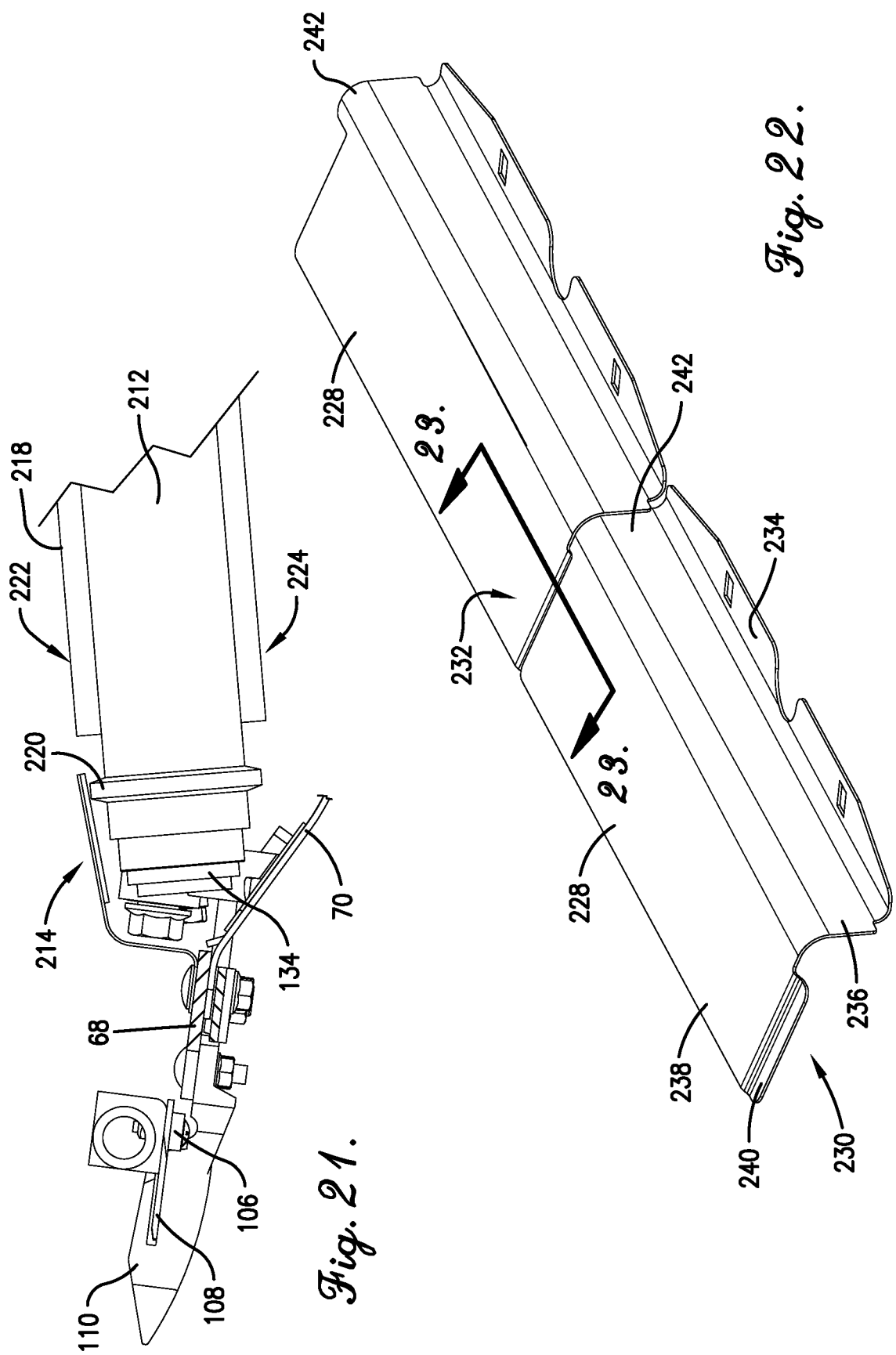

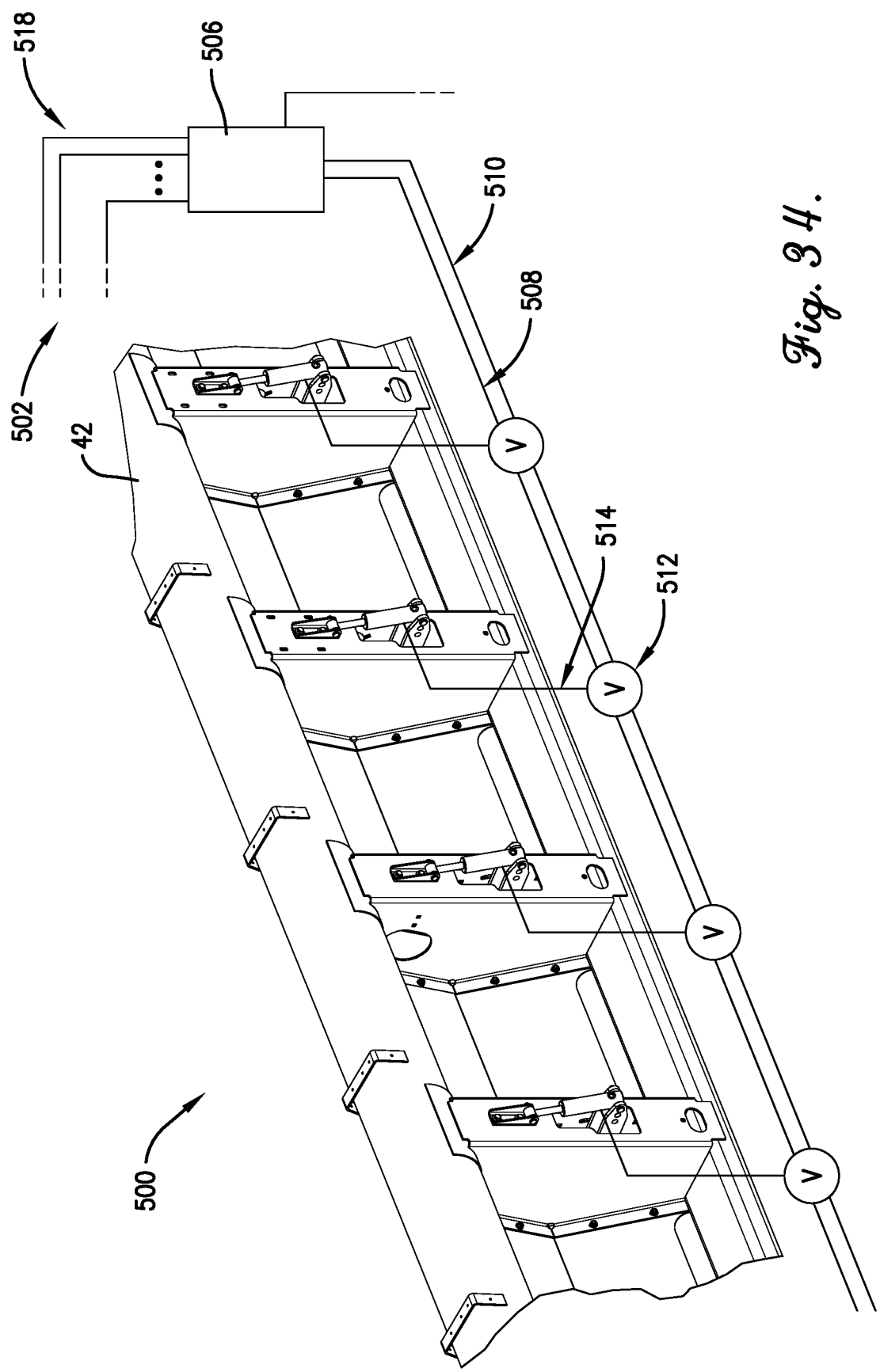

FLEXIBLE HEADER WITH SECTIONAL HEIGHT ADJUSTMENT

CROSS-REFERENCE TO RELATED APPLICATIONS

This application is a national phase entry under 35 U.S.C. § 371 of International Patent Application PCT/IB2018/057892, filed Oct. 11, 2018, designating the United States of America and published in English as International Patent Publication WO 2019/111069 A1 on Jun. 13, 2019, which claimed the benefit of the filing date of U.S. Provisional Patent Application 62/596,646, "Flexible Header with Sectional Height Adjustment," filed Dec. 8, 2017.

FIELD

The present invention relates to harvesting headers, and more particularly, embodiments concern a flexible harvesting header having multiple sections supported by support arms, with the height of each support arm being adjustable in response to changing loads.

BACKGROUND

A traditional grain harvesting implement or machine, such as a self-propelled combine, is used to harvest a variety of grains, such as wheat, soybeans, and rice. Combines typically include a harvesting header that cuts the crop and gathers the crop material into a feeder house for threshing and other operations. For some grains, such as wheat, the sickle of the header can be spaced from the ground during the cutting operation. For other grains, the sickle must be positioned close to the ground, often with the header in sliding contact with the ground, in order to collect most of the grain. Flexible headers are used to follow the natural contours of the field while cutting the grain.

Conventional grain harvesters are problematic and suffer from various limitations. For example, flexible headers that include a flexible cutterbar are ineffective at receiving all of the severed crop material when following the ground contour at a high speed. Prior art flexible headers are also deficient because they fail to convey all of the received cut crop material to the feeder house. Furthermore, harvesters with flexible headers ineffectively control the header height, particularly when the header is in sliding contact with the ground. Yet further, prior art flexible headers become damaged when operating in close proximity to the ground, particularly when the terrain has a significant contour.

Some crops, such as second crop beans, can accumulate in front of the skid plates. This can also occur when harvesting on the ground and the material is damp or loose. Additionally, when raising the header, there is an initial tendency for the guards to tip downwardly, causing them to dig into the ground, which can damage the header and reduce productivity. The header is meant to "float" over the ground during harvesting. When material accumulates in front of the header, ground pressure increases, which can further exacerbate the problem. One solution has been to use bigger hydraulic cylinders on both ends of the header to better adjust for the increased weight. However, while this keeps the outer tips pointed upward, it does nothing for the intermediate support arms.

This background discussion is intended to provide information related to the present invention which is not necessarily prior art.

SUMMARY

Embodiments address the above-described and other problems by providing a flexible harvesting header having multiple sections supported by support arms, with the height of each support arm being adjustable in response to changing loads. In one embodiment of the present invention, a header for harvesting a crop may broadly comprise a flexible cutter bar assembly, a plurality of laterally spaced apart support arms, a plurality of load sensors, a plurality of hydraulic cylinders, and a controller. The flexible cutterbar assembly may extend lengthwise in a lateral direction relative to a normal direction of travel of the header. The support arms may be configured to support the flexible cutter bar assembly, with each support arm including a first end attached to the flexible cutterbar assembly, and a second end pivotal about a laterally extending axis so that the flexible cutterbar assembly is configured to flex in response to changes in terrain as the header is advanced. Each load sensor may be located at the first end of one of the support arms and configured to sense a load on the first end and generate an electronic load signal. Each hydraulic cylinder may be located at the second end of one of the support arms and actuatable to adjustably raise and lower the first end of the support arm. The controller may be configured to receive the electronic load signals generated by the load sensors, determine whether the load signals indicate that actuating one or more of the hydraulic cylinders is warranted due to a changing load at the first ends of one or more of the support arms, and if so, send a control signal to change a hydraulic pressure in the one or more hydraulic cylinders to raise or lower the first ends of the one or more support arms to offset the changing load.

Various implementations of the foregoing embodiments may include any one or more of the following additional features. The header may further include a plurality of skid plates, with each skid plate being associated with the front end of one of the support arms, and wherein each load sensor is associated with one of the skid plates. The header may further include a hydraulic assembly include a pressure line for increasing a hydraulic fluid and thereby increasing the hydraulic pressure; a return line for decreasing the hydraulic fluid and thereby decreasing the hydraulic pressure; a plurality of valves, with each valve being associated with one of the hydraulic cylinders, coupled with the pressure line and return lines, and configured to open to allow the hydraulic fluid to move into or out of the hydraulic cylinder; and a plurality of valve lines, with each valve line being coupled with one of the hydraulic cylinders and one of the valves, and configured to allow the hydraulic fluid to move into or out of the hydraulic cylinder via the open valve.

The controller may determine whether actuating one or more of the hydraulic cylinders is warranted by determining whether the changing load exceeds a pre-determined changing load value. The pre-determined changing load value may be at least five percent, or at least ten percent. All or only some of the support arms may be provided with one of the load sensors, all or only some of the support arms may be provided with one of the hydraulic cylinders, and/or all or only some of the hydraulic cylinders may be actuatable by the controller. The entire flexible cutter bar may be configured to be raised in response to an electronic raise signal, and the controller may be configured to receive the electronic raise signal and determine whether the electronic raise signal is present for at least a pre-determined time period, and if so, cause the hydraulic pressure in all of the hydraulic cylinders to be increased to raise the front ends of all of the support arms. The pre-determined time period may be no longer than five seconds, or no longer than one second.

This summary is not intended to identify essential features of the present invention, and is not intended to be used to limit the scope of the claims. These and other aspects of the present invention are described below in greater detail.

DRAWINGS

Embodiments of the present invention are described in detail below with reference to the attached drawing figures, wherein.

Figure 1:
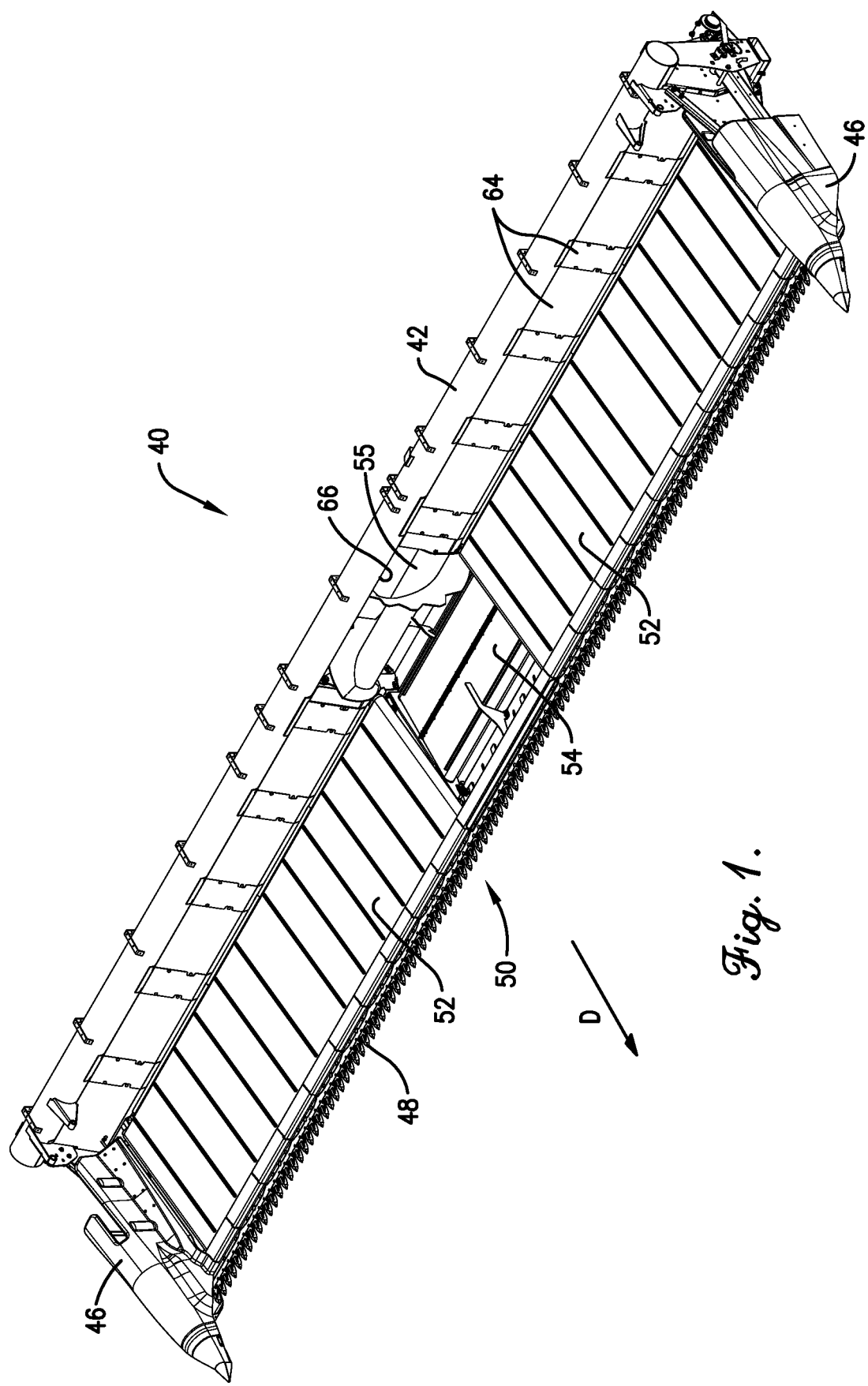
FIG. 1 is a left front perspective view of a harvesting header constructed in accordance with a first embodiment of the present invention.
Figure 2:
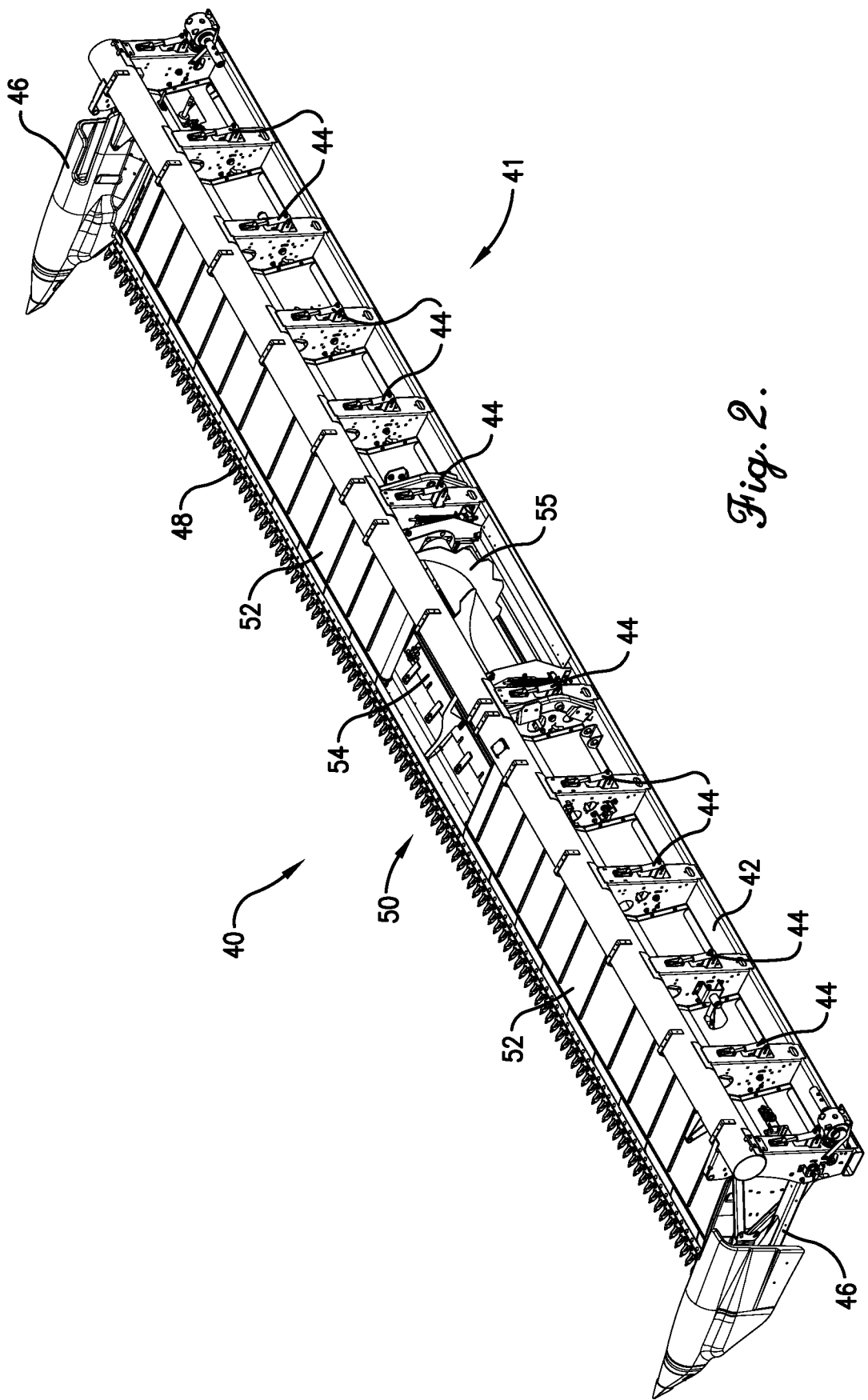
FIG. 2 is a left rear perspective view of the harvesting header shown in FIG. 1.
Figure 3:
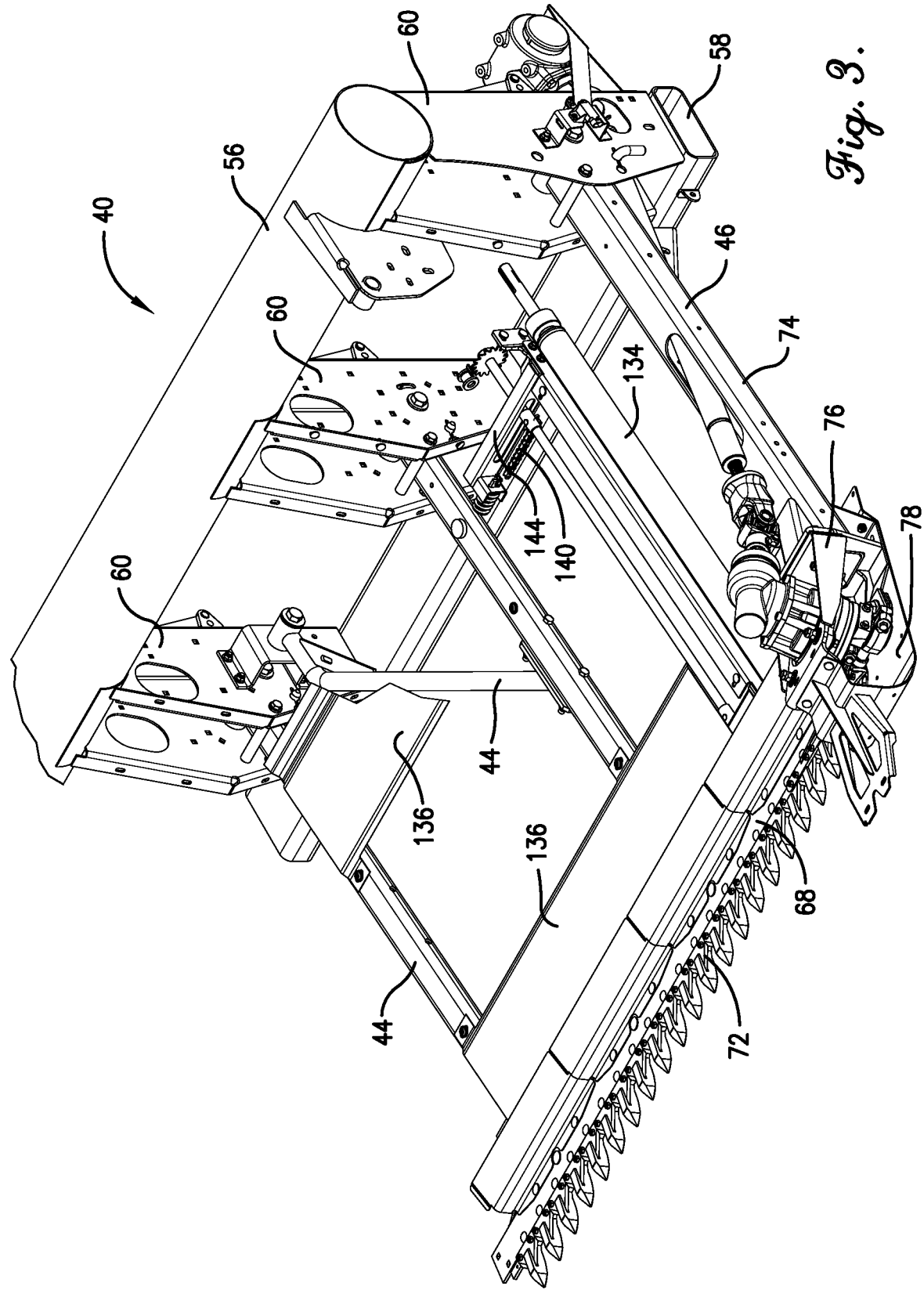
Figure 4:
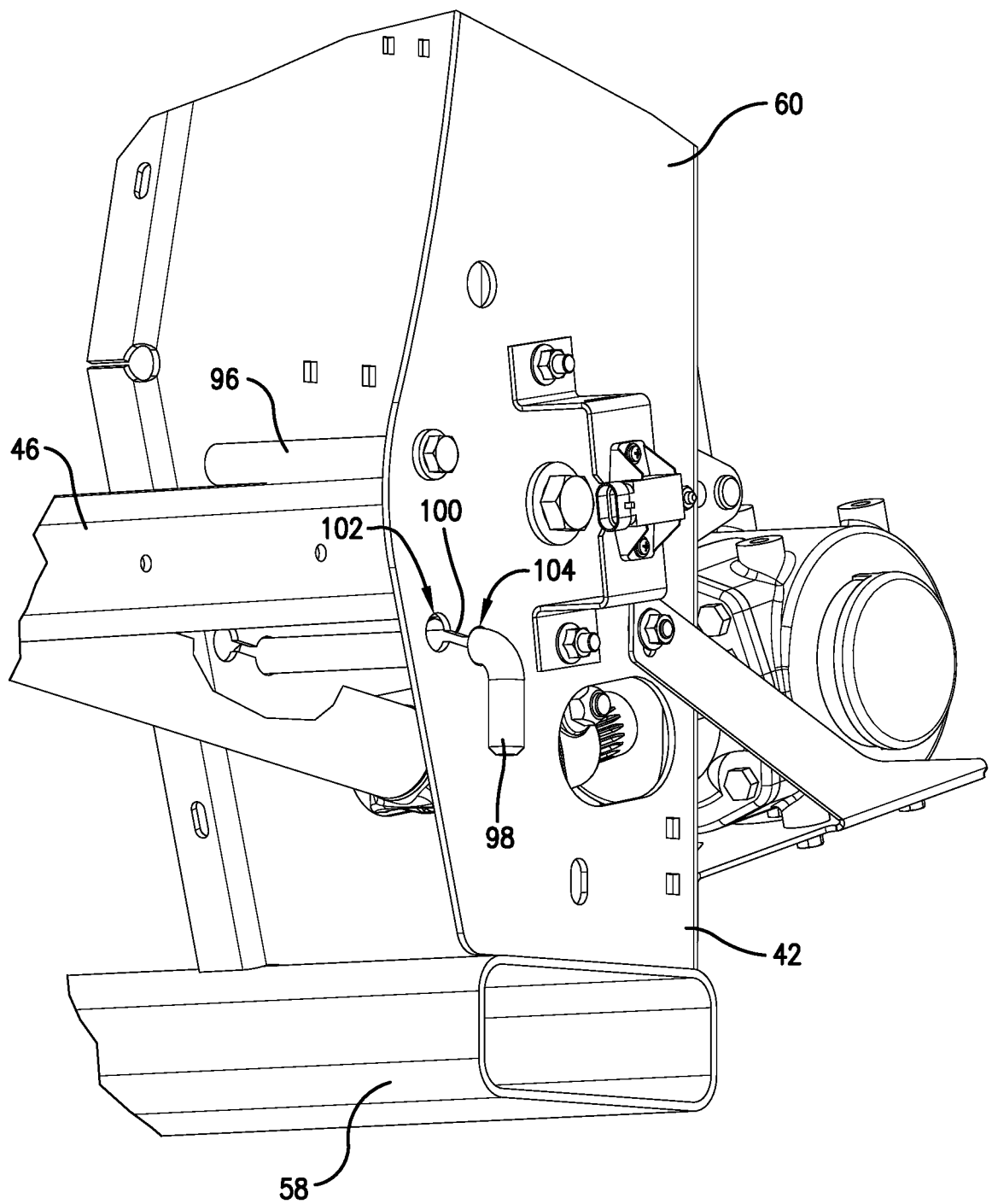
Figure 5:
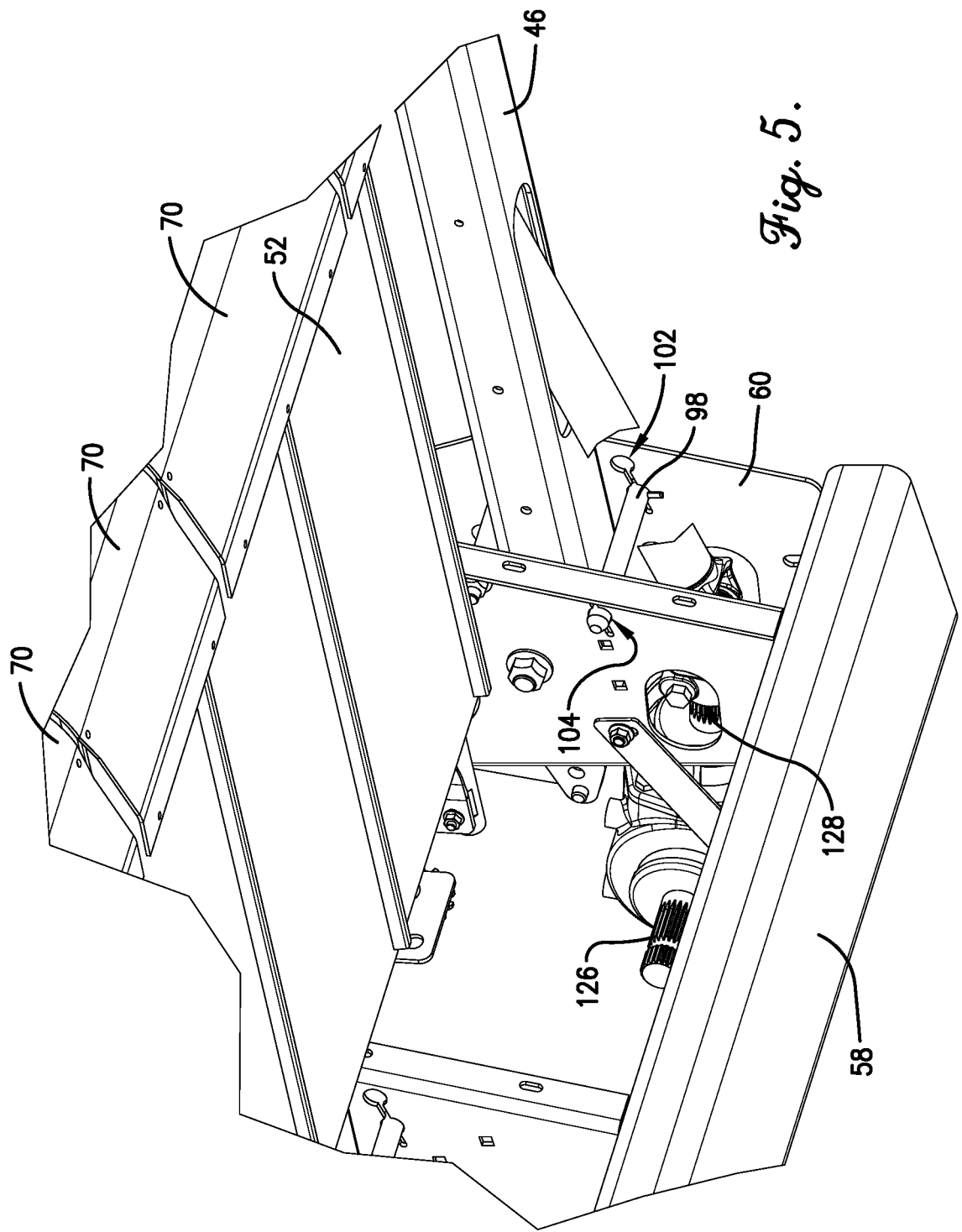
Figure 6:
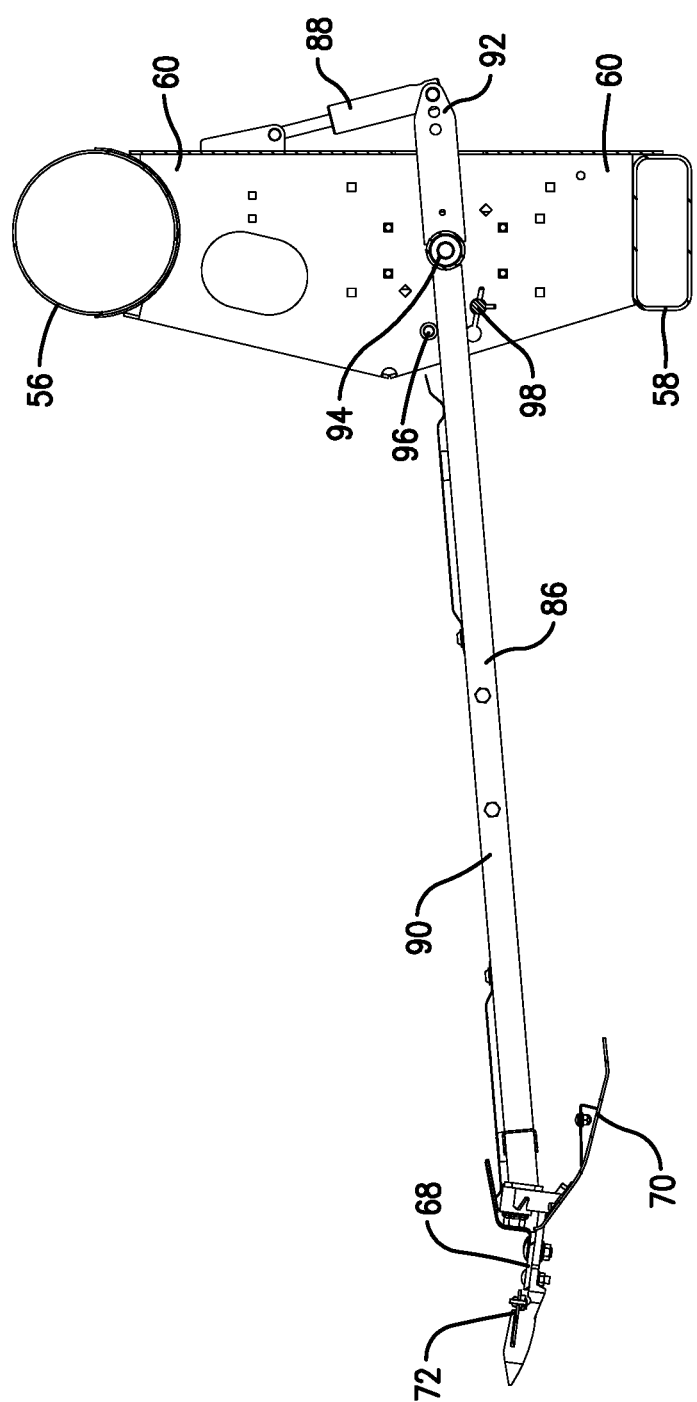
Figure 7:
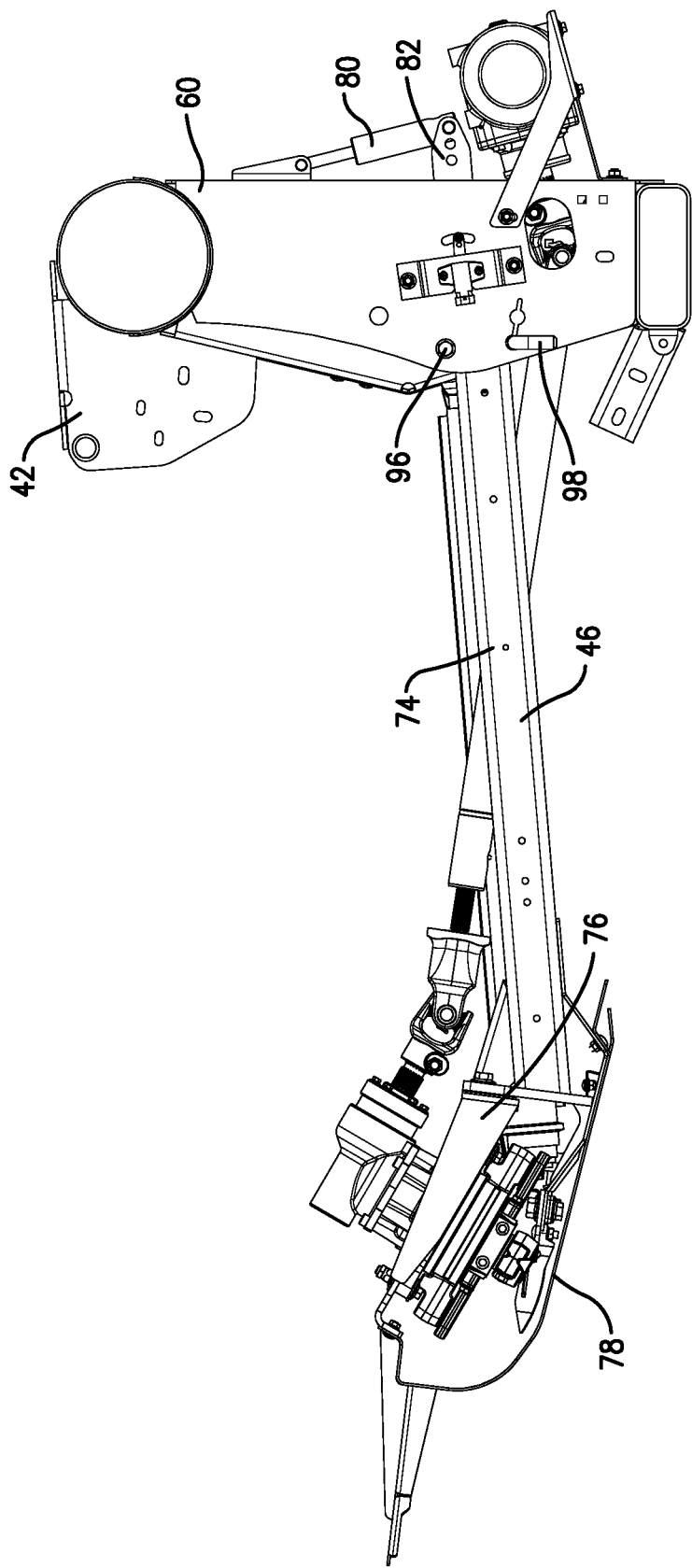
Figure 8:
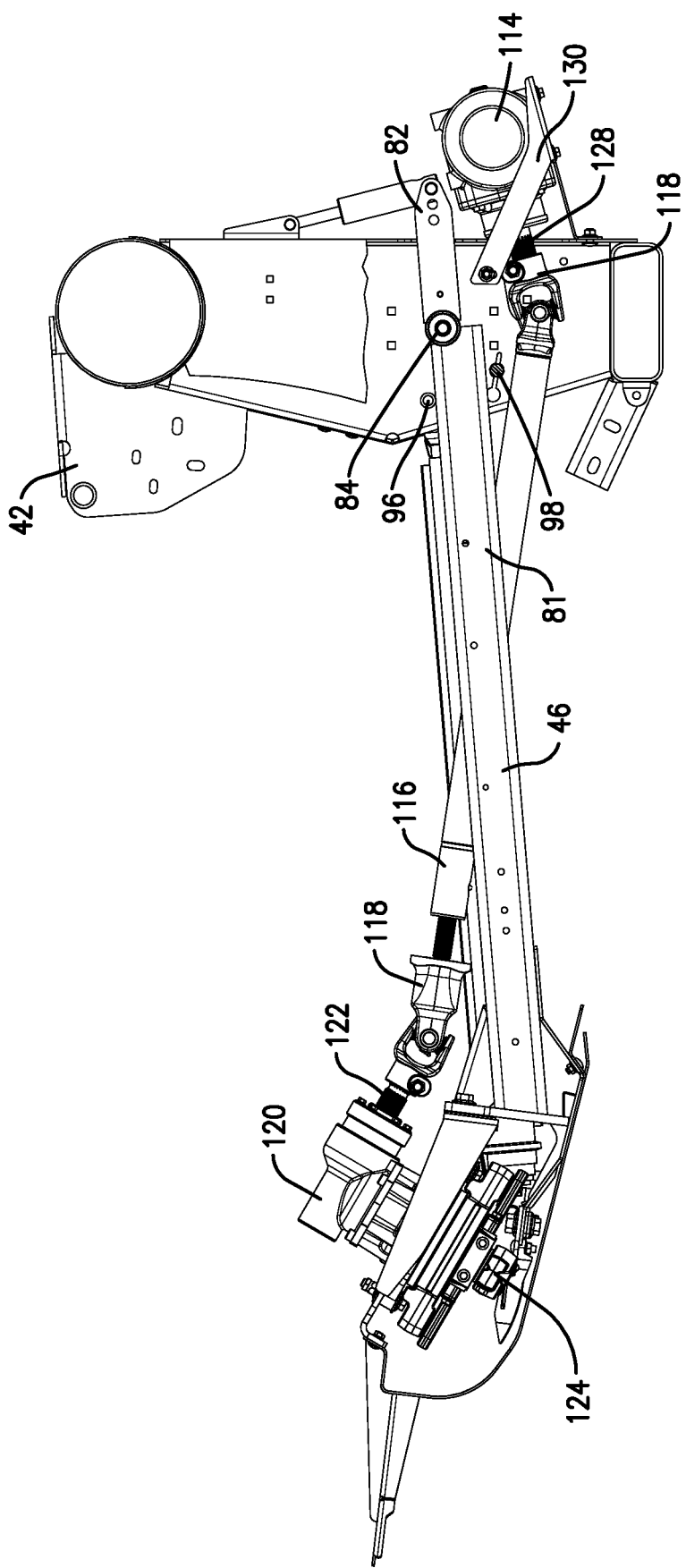
Figure 9:
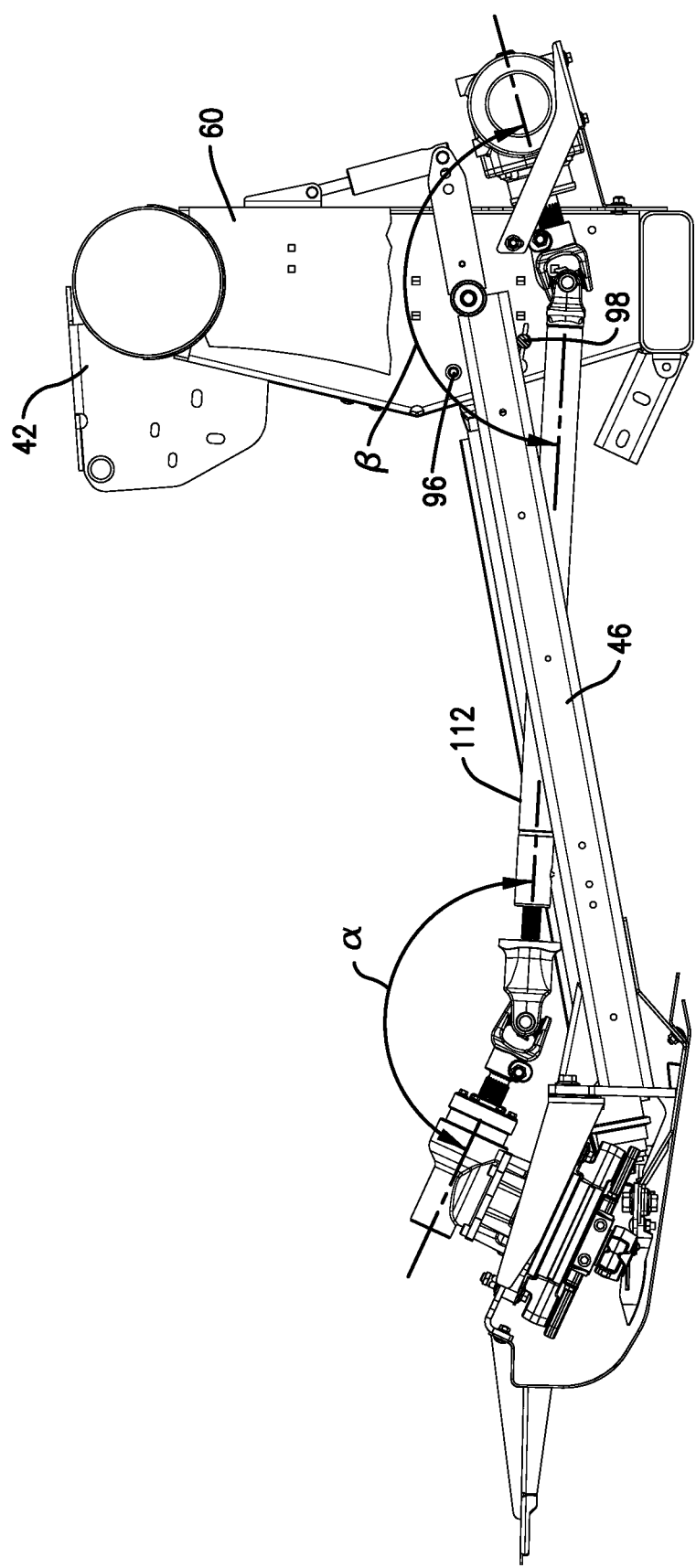
Figure 10:
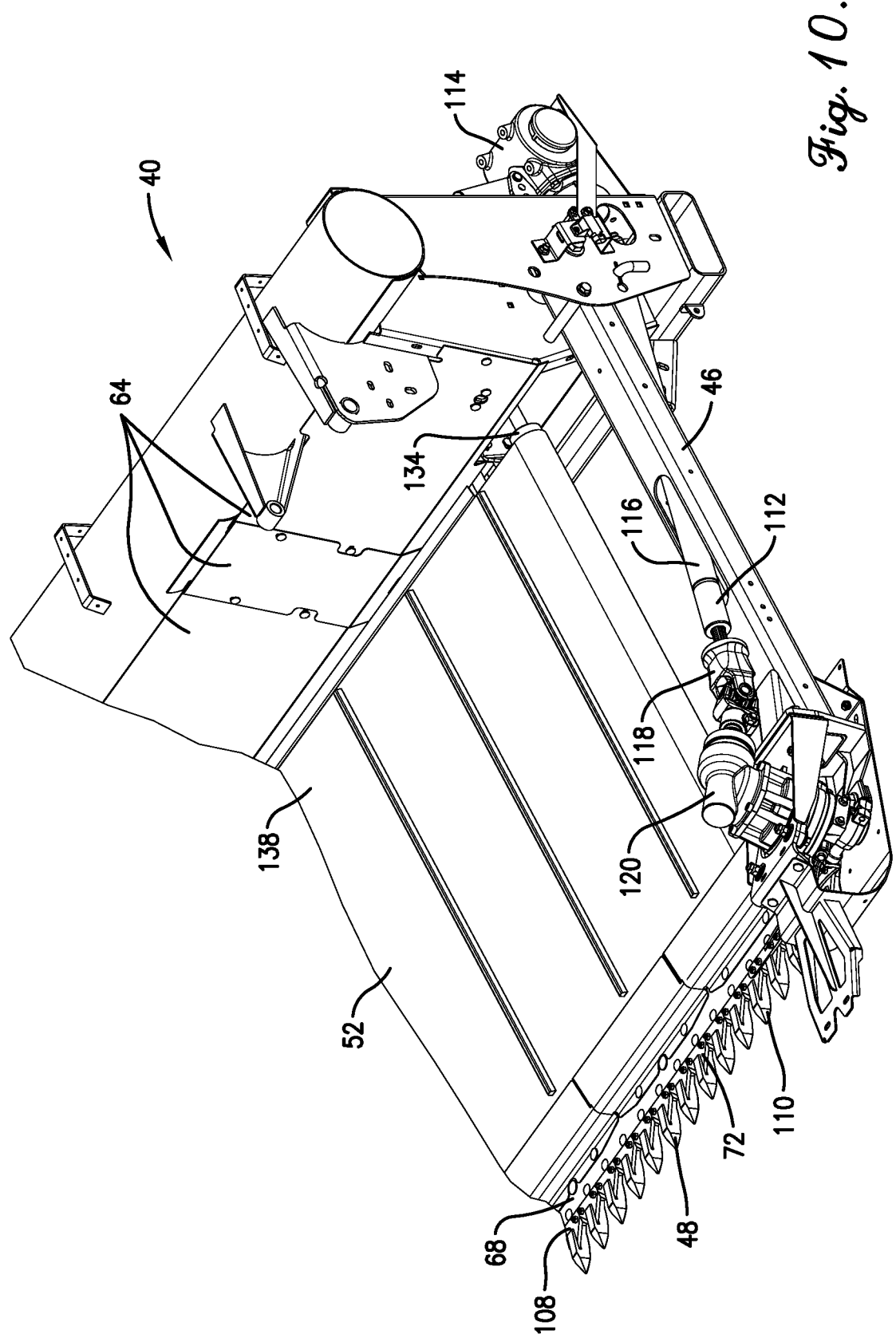
Figure 11:
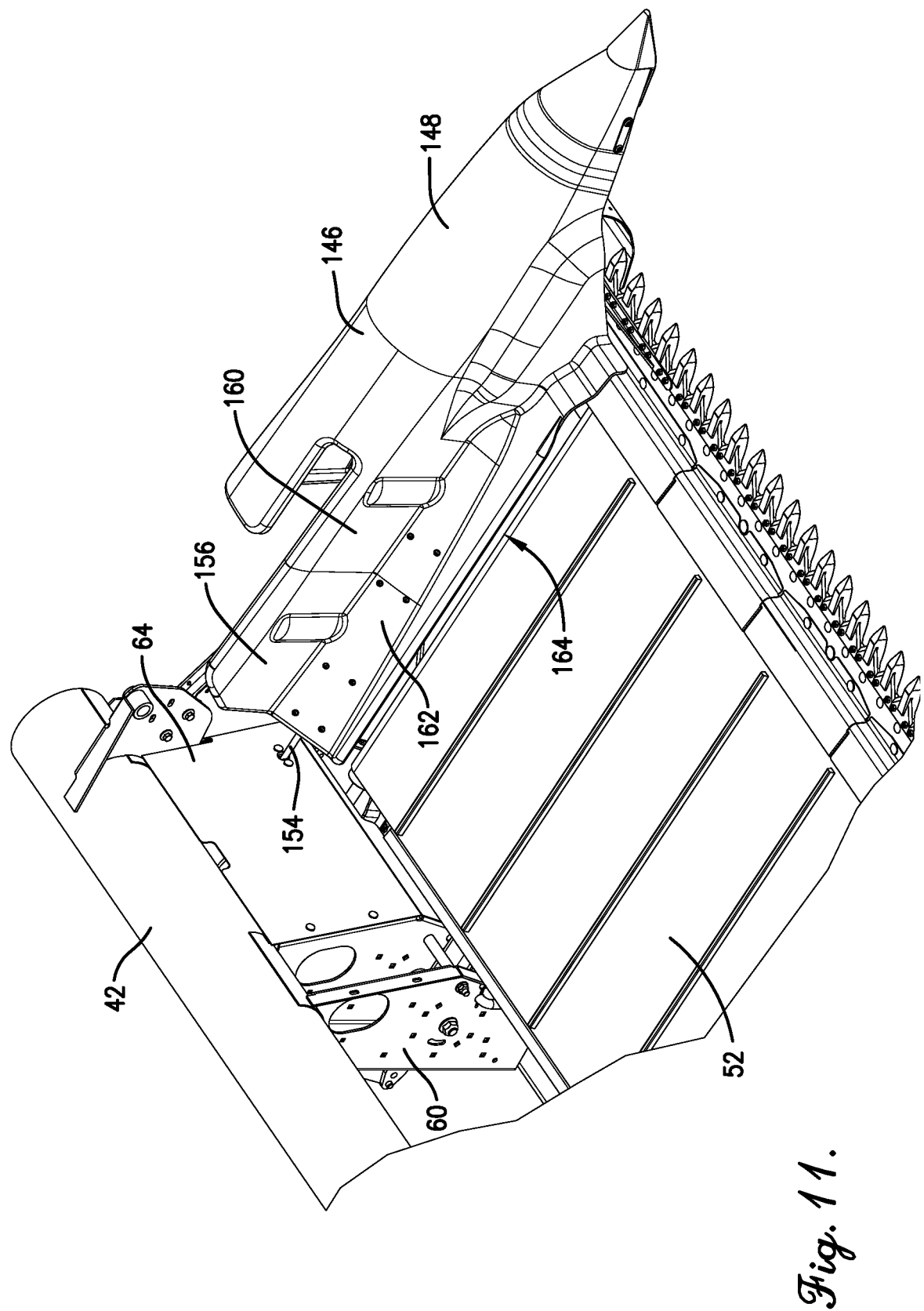
Figure 12:
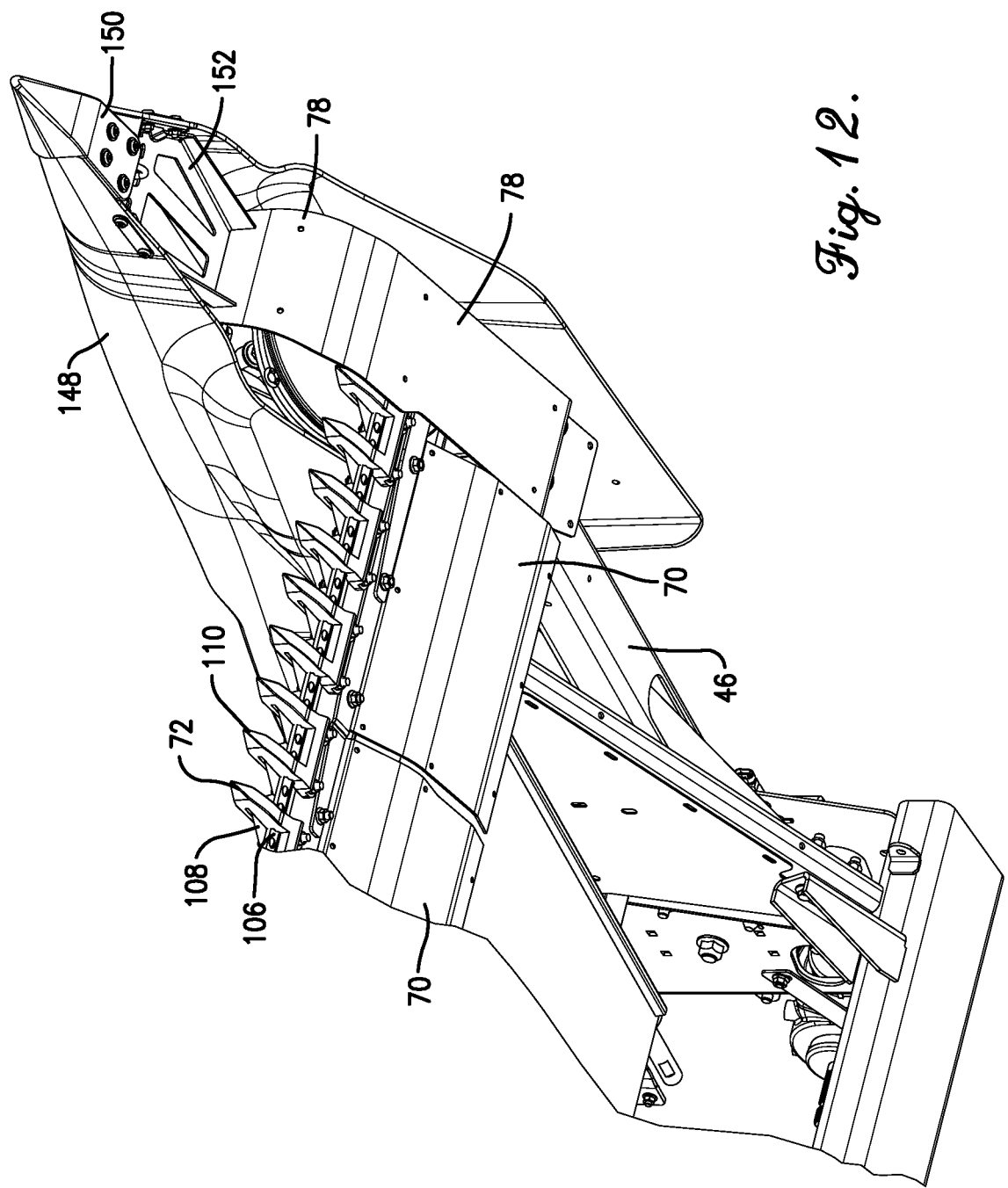
Figure 13:
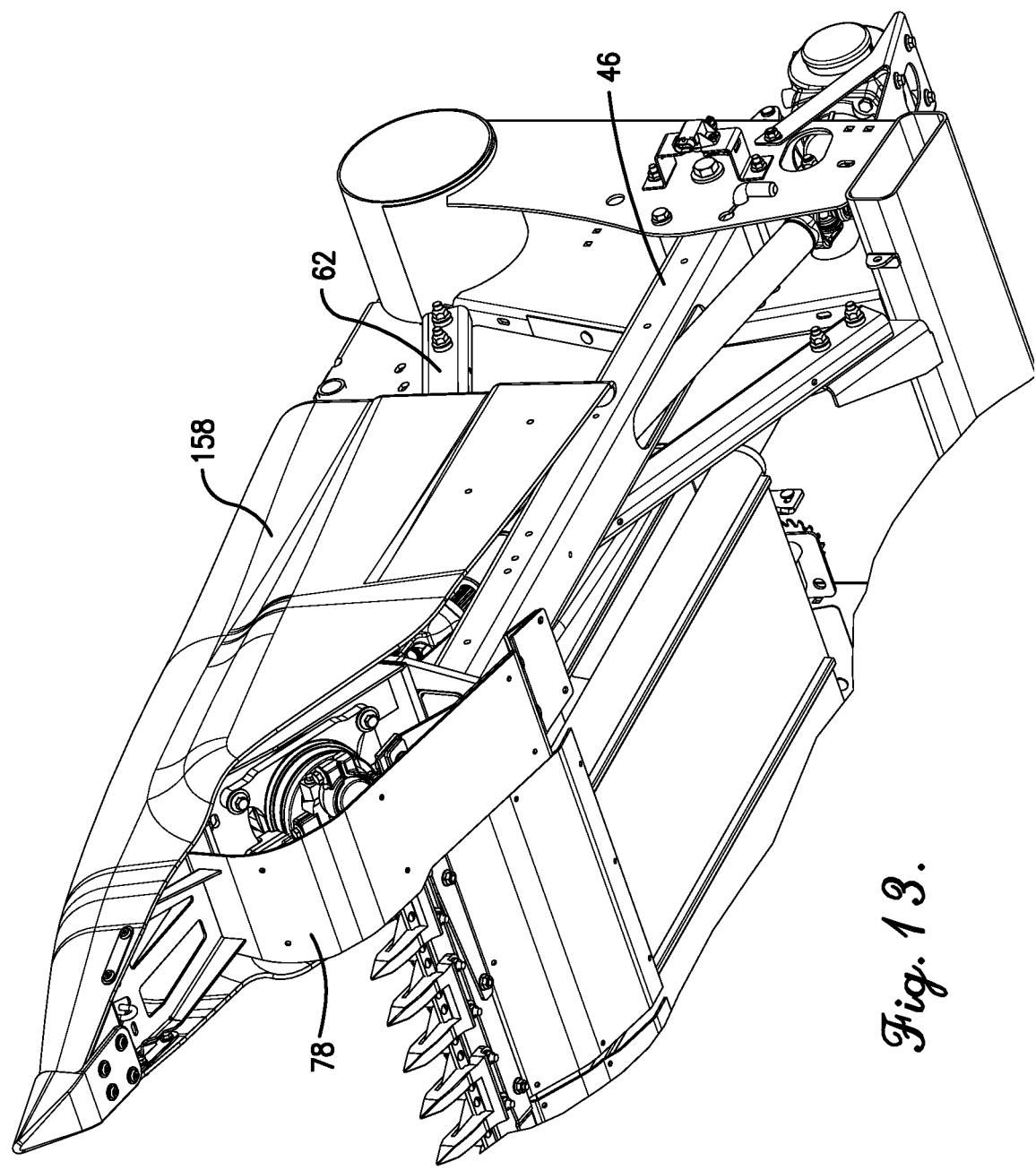
Figure 14:
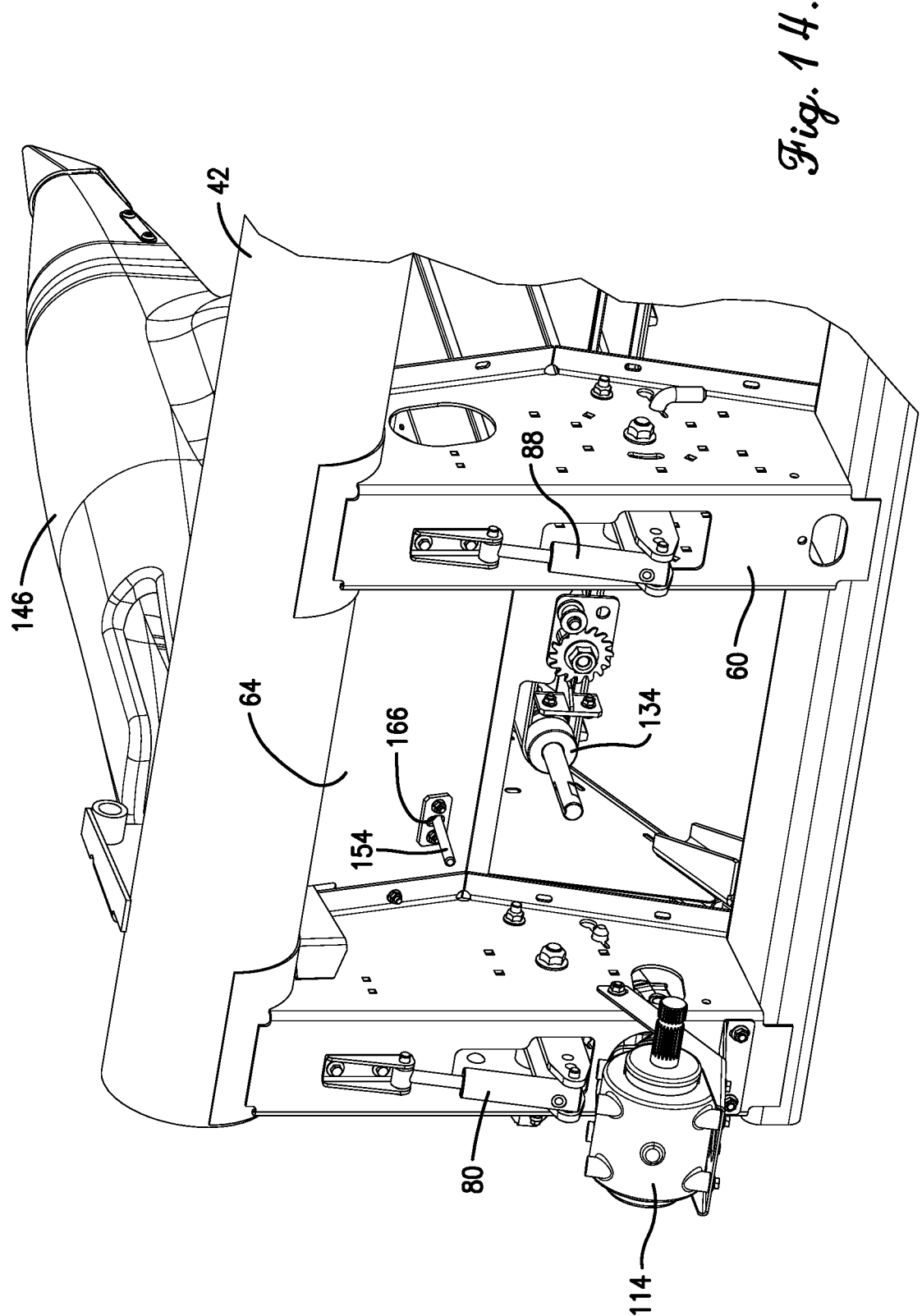
Figure 15:
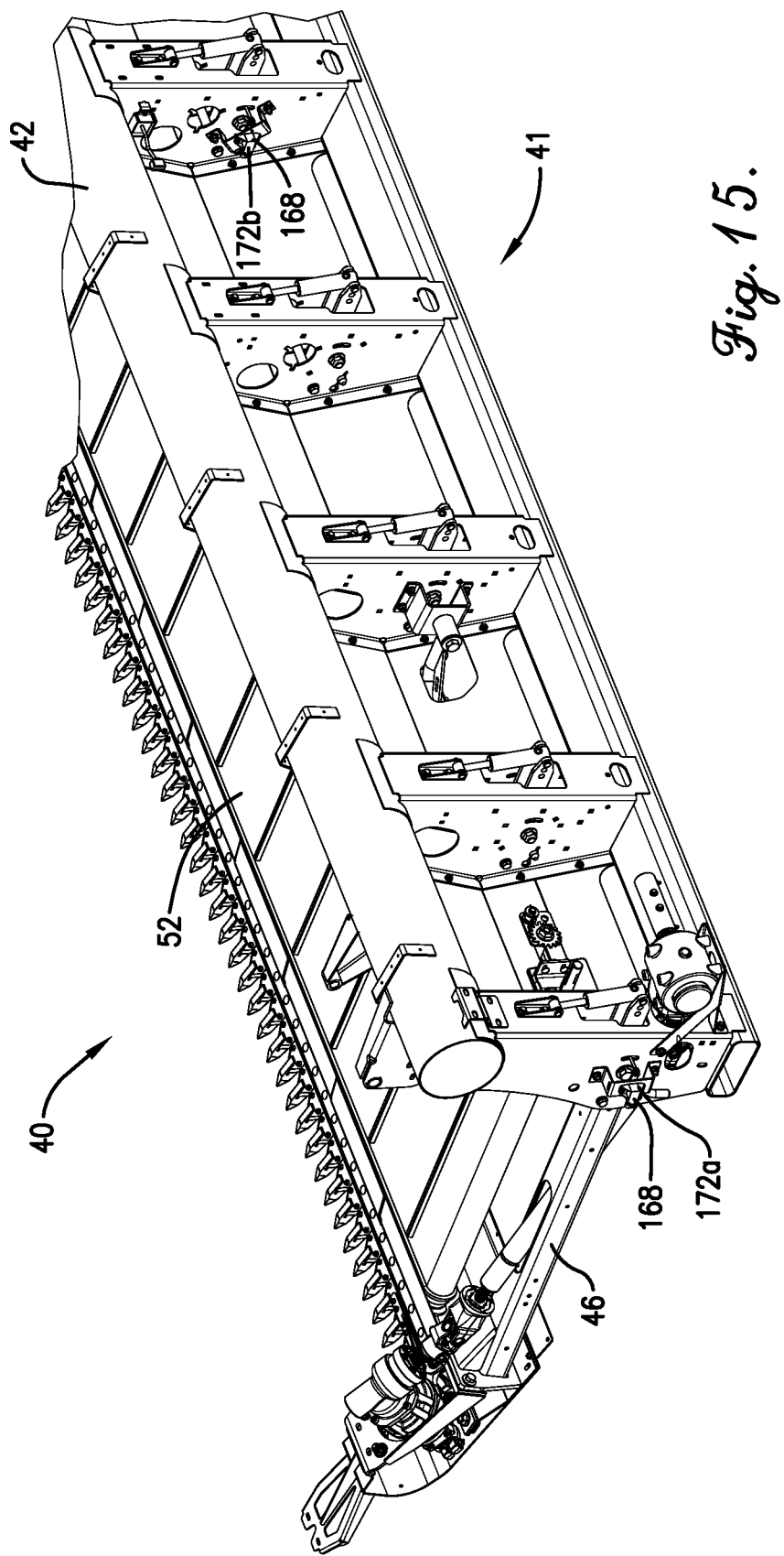
Figure 16:
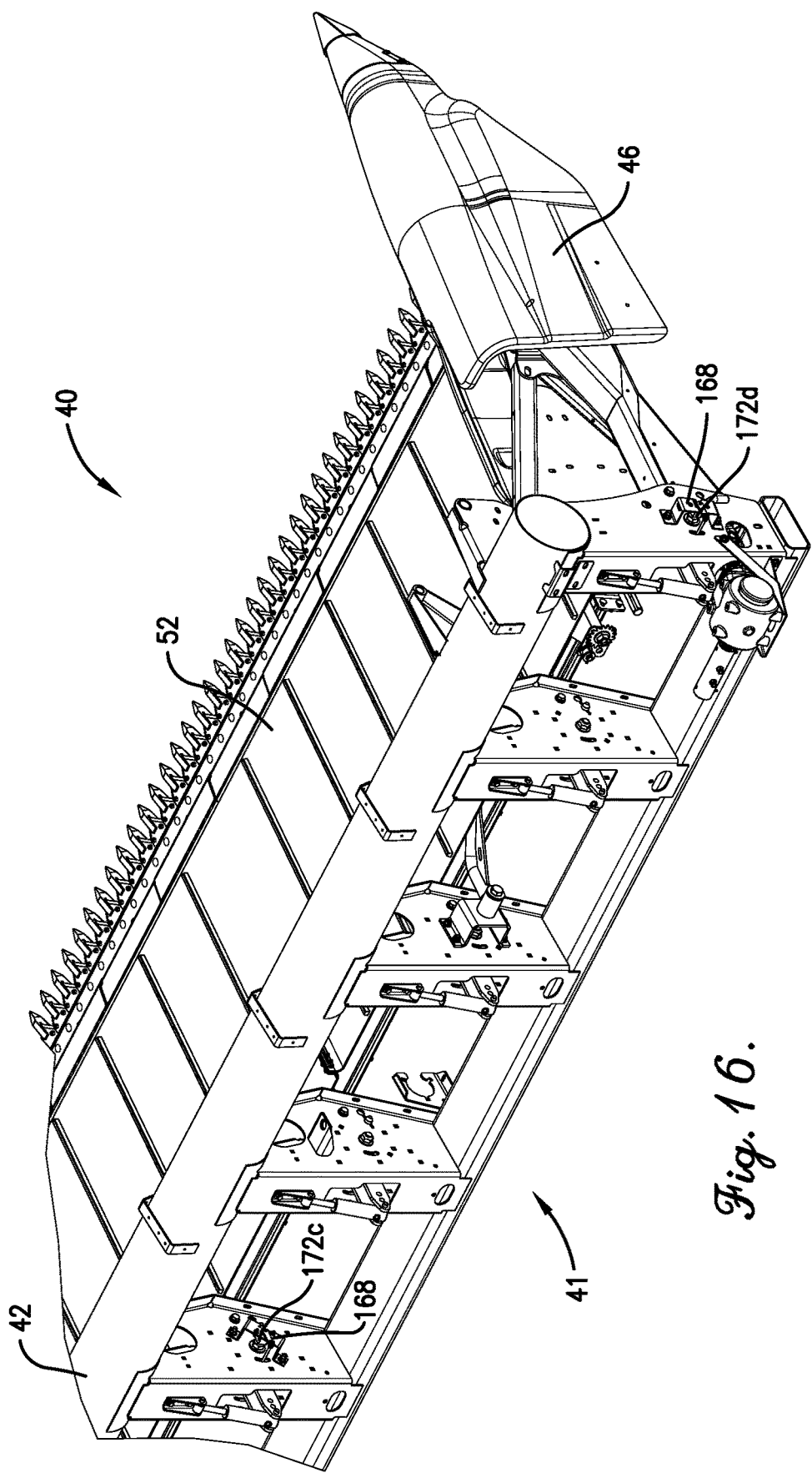
Figure 17:
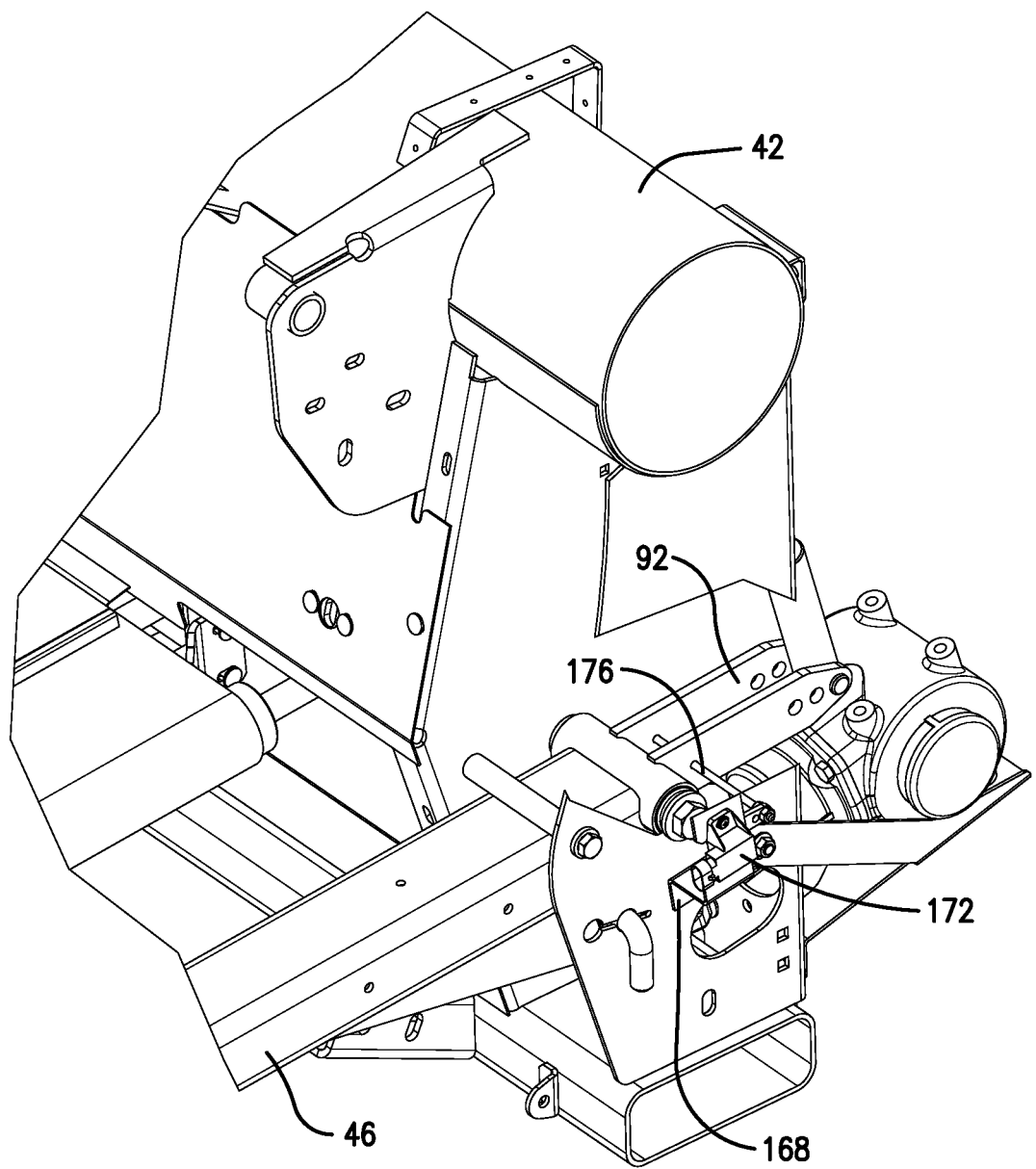
Figure 18:
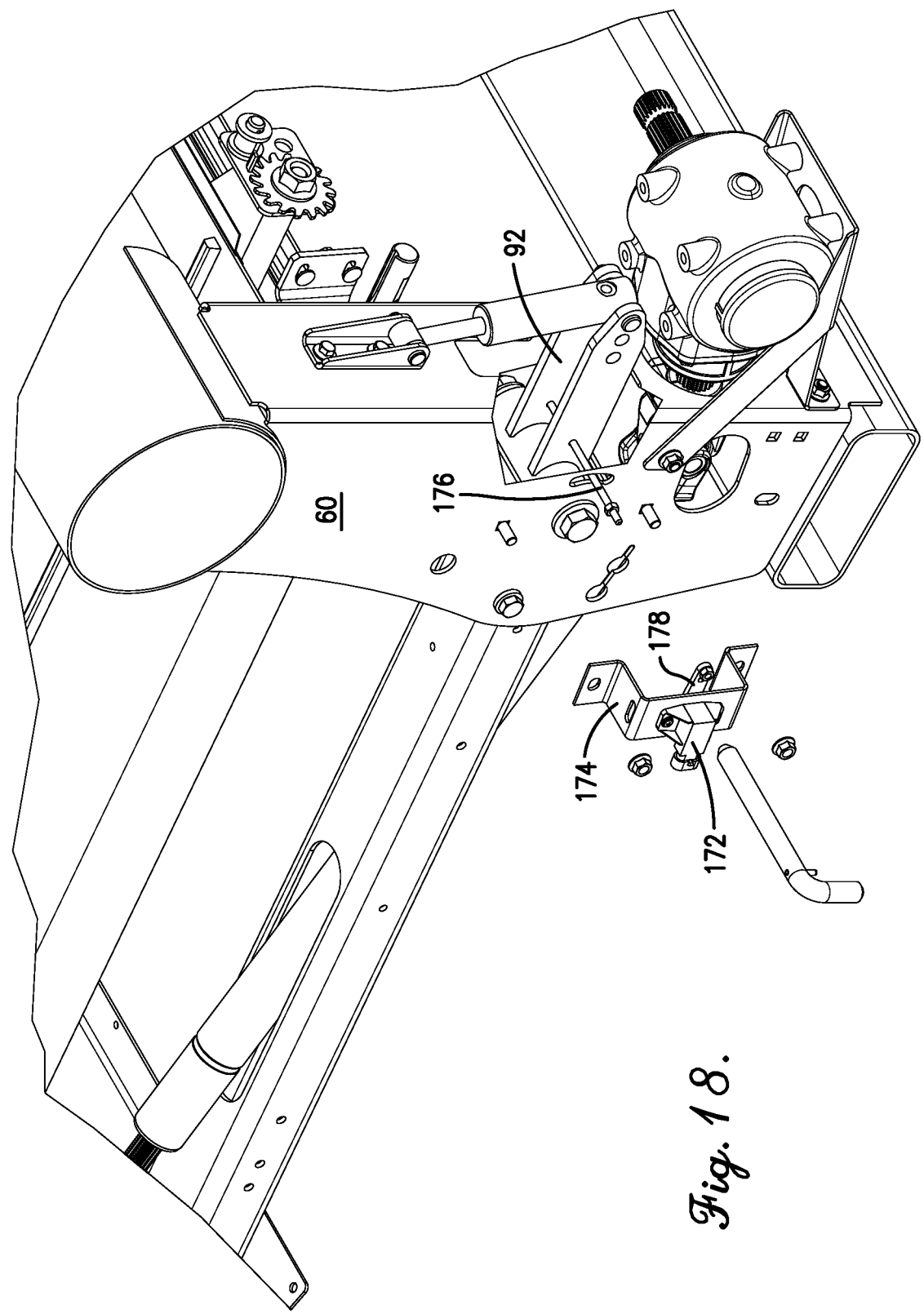
Figure 19:
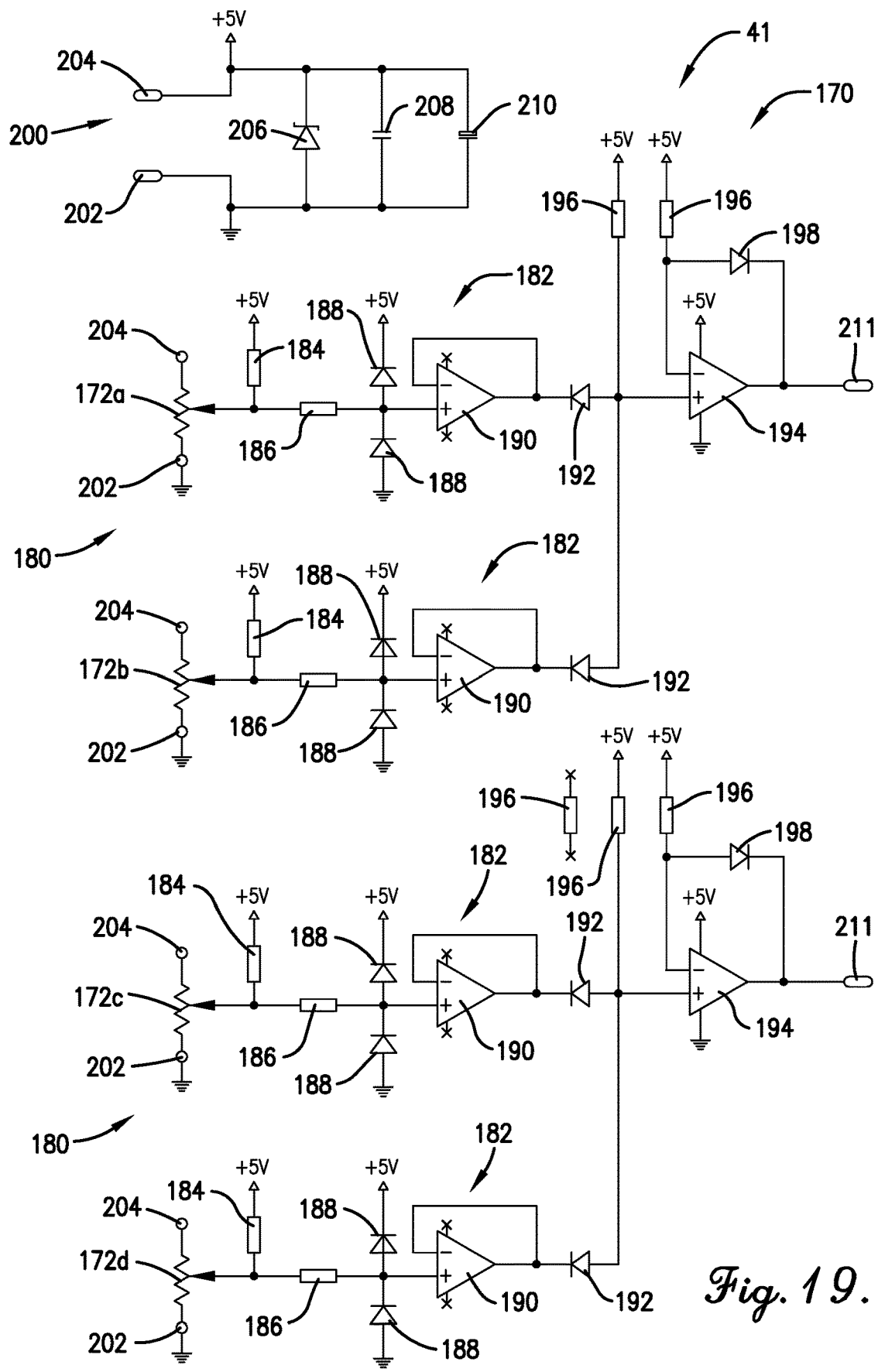
Figure 20:
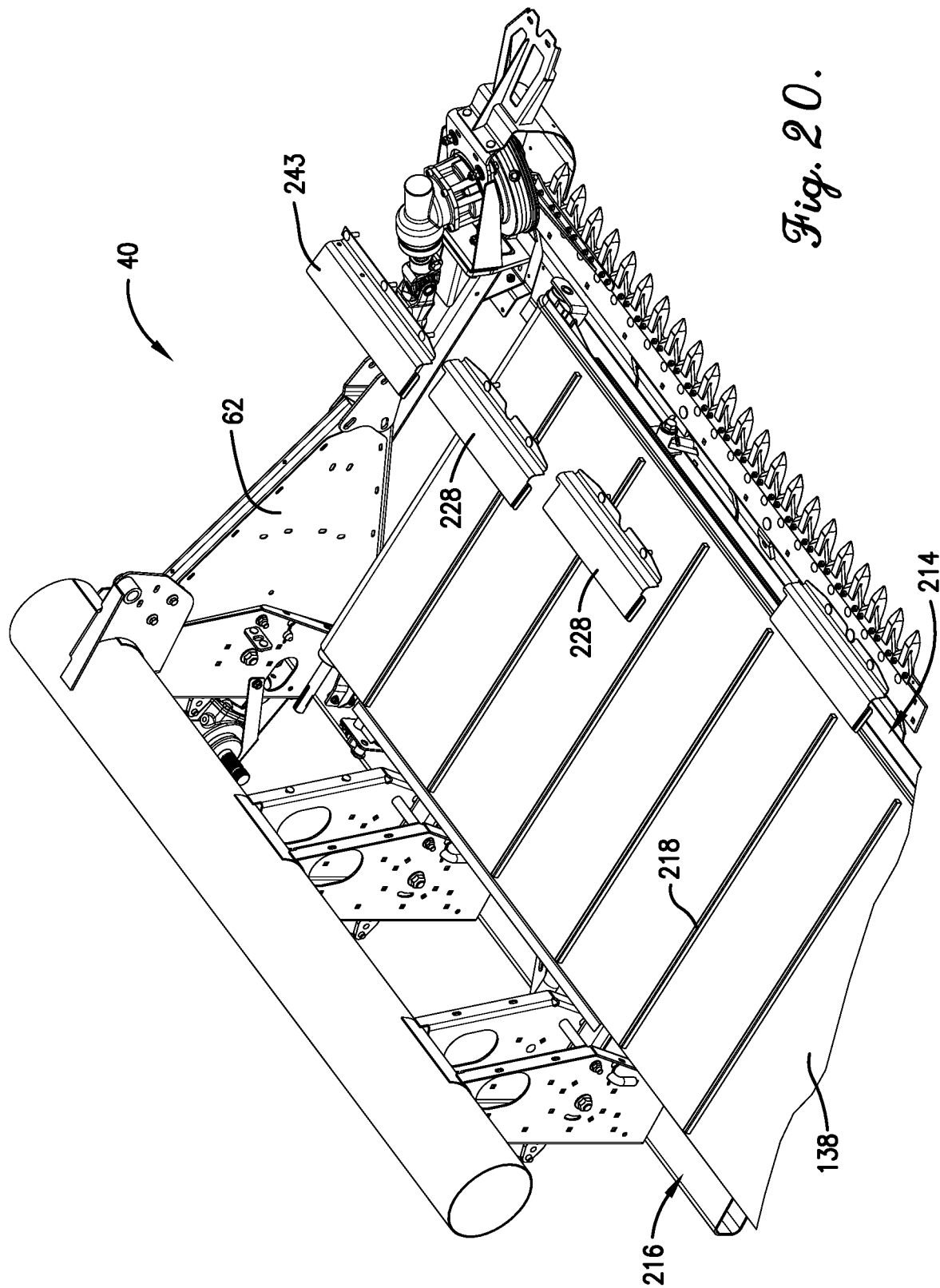
Figure 23:
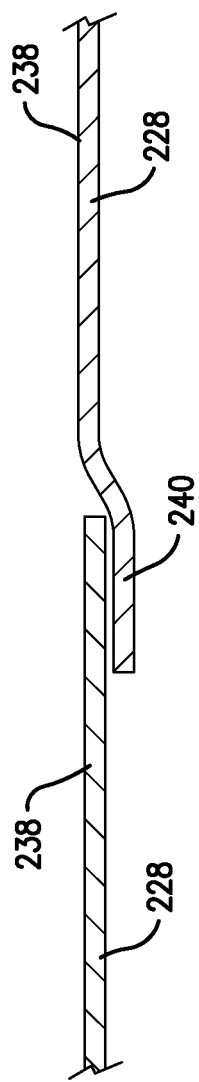
Figure 24:
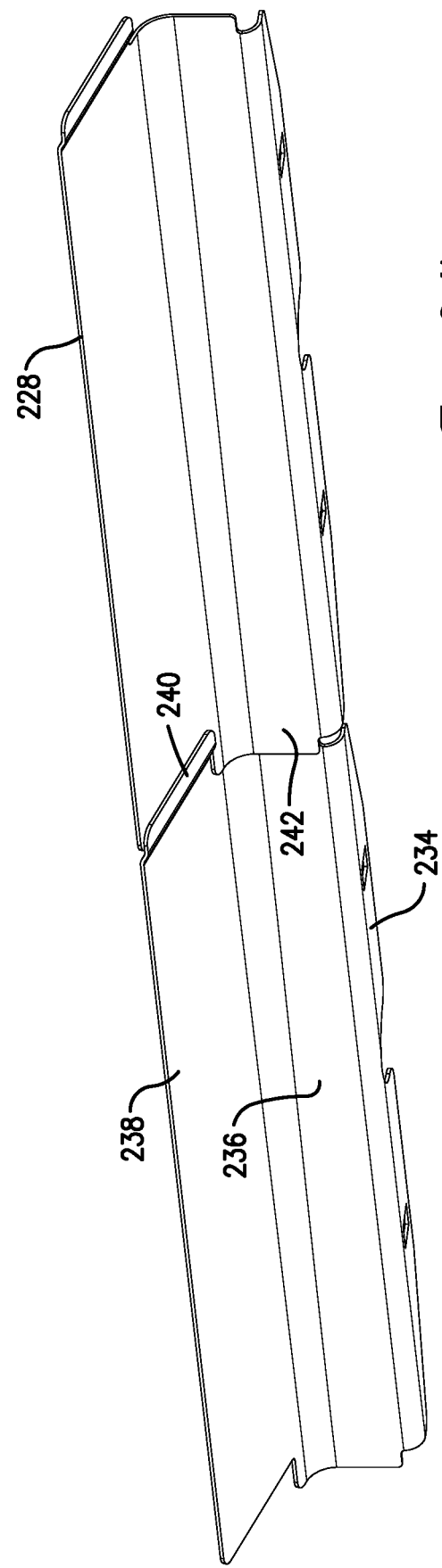
Figure 25:
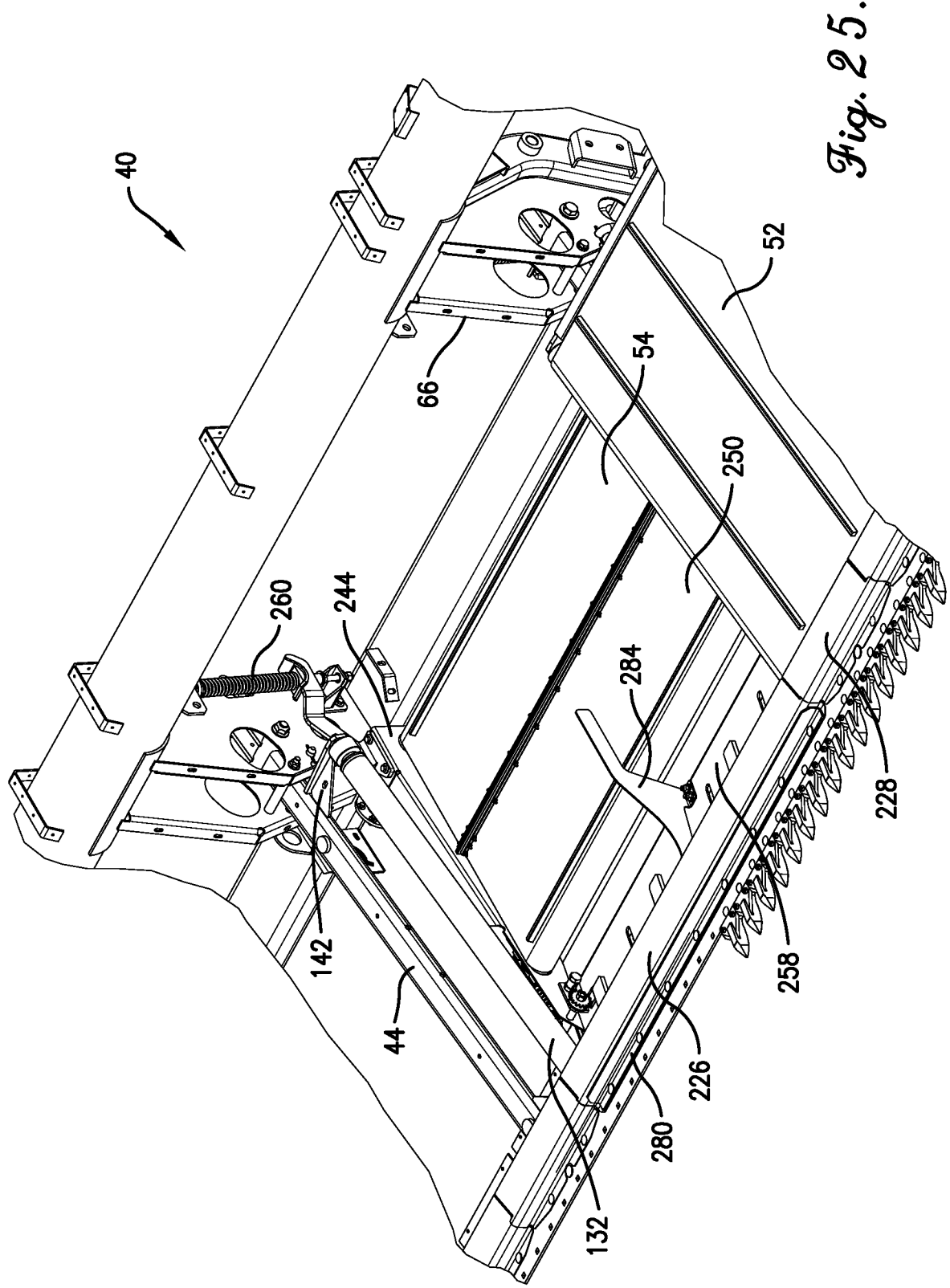
Figure 26:
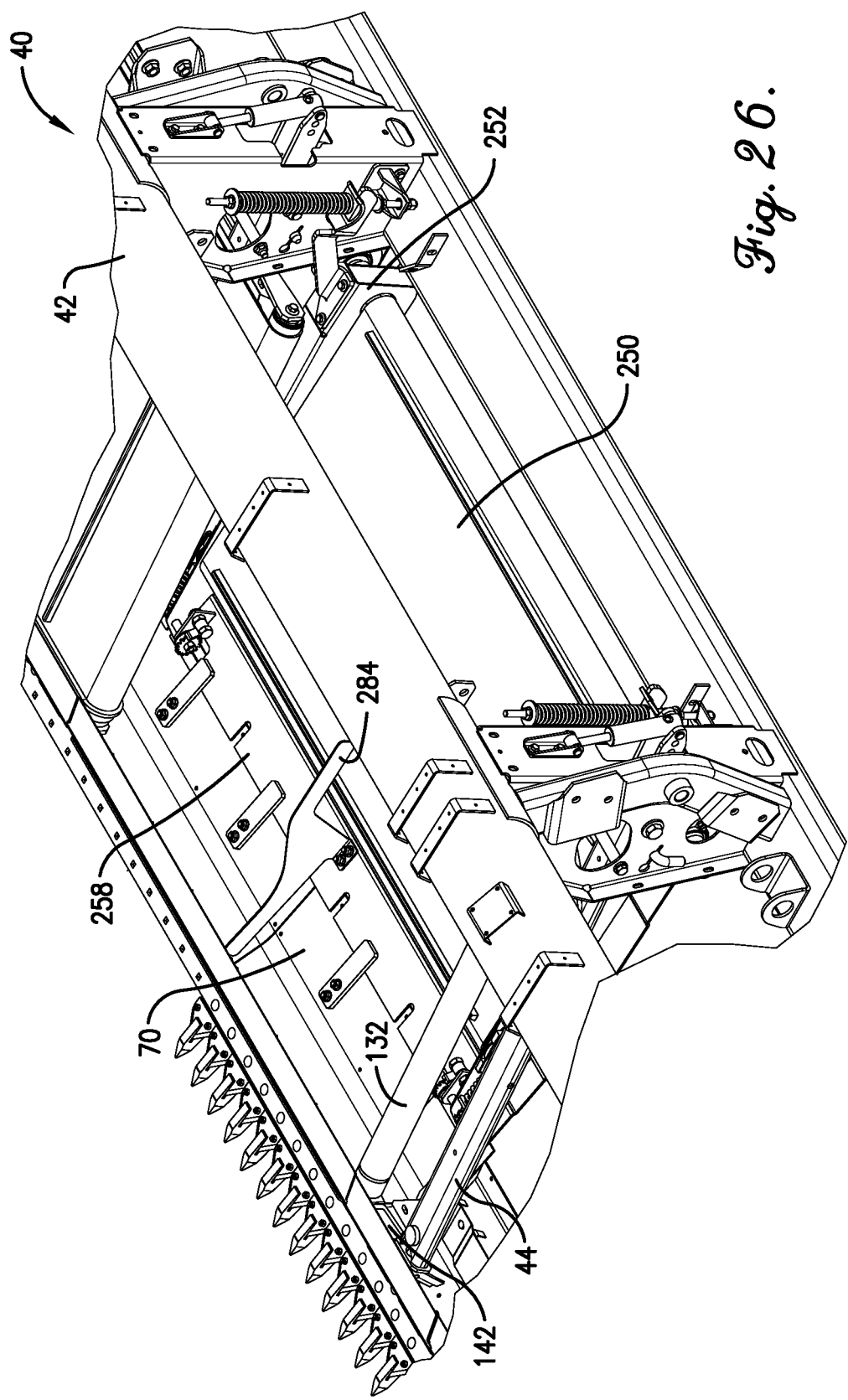
Figure 27:
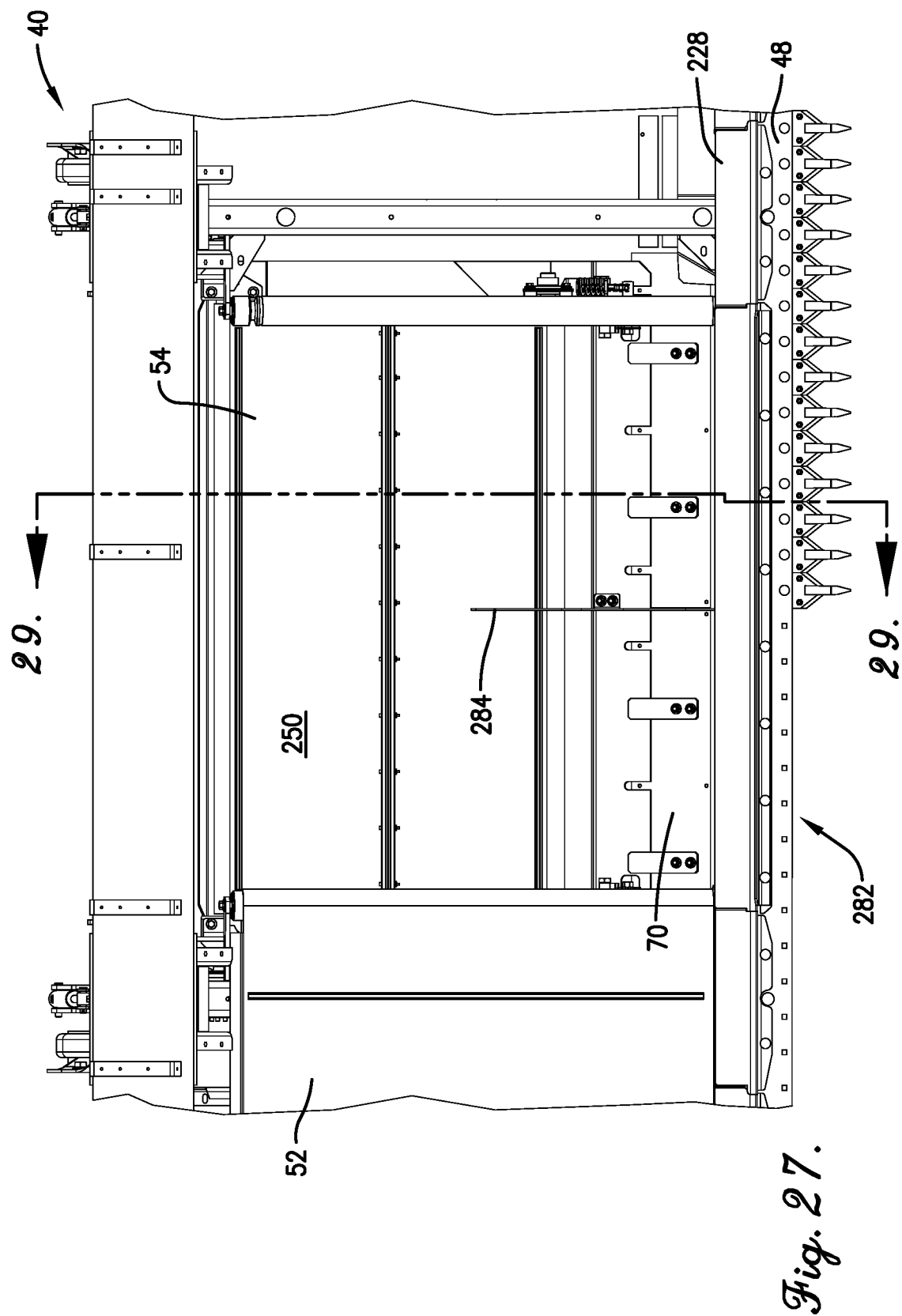
Figure 28:
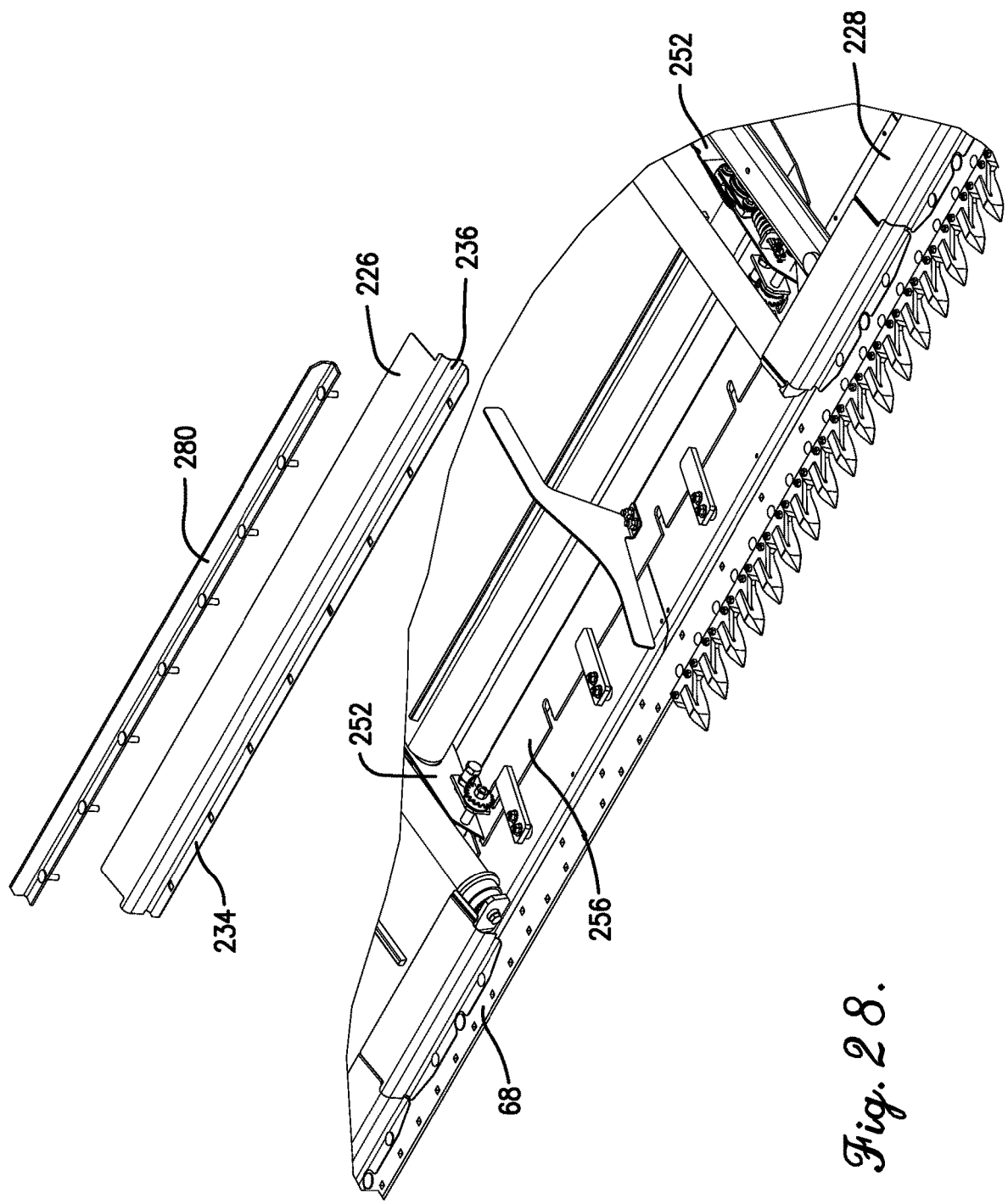
Figure 29:
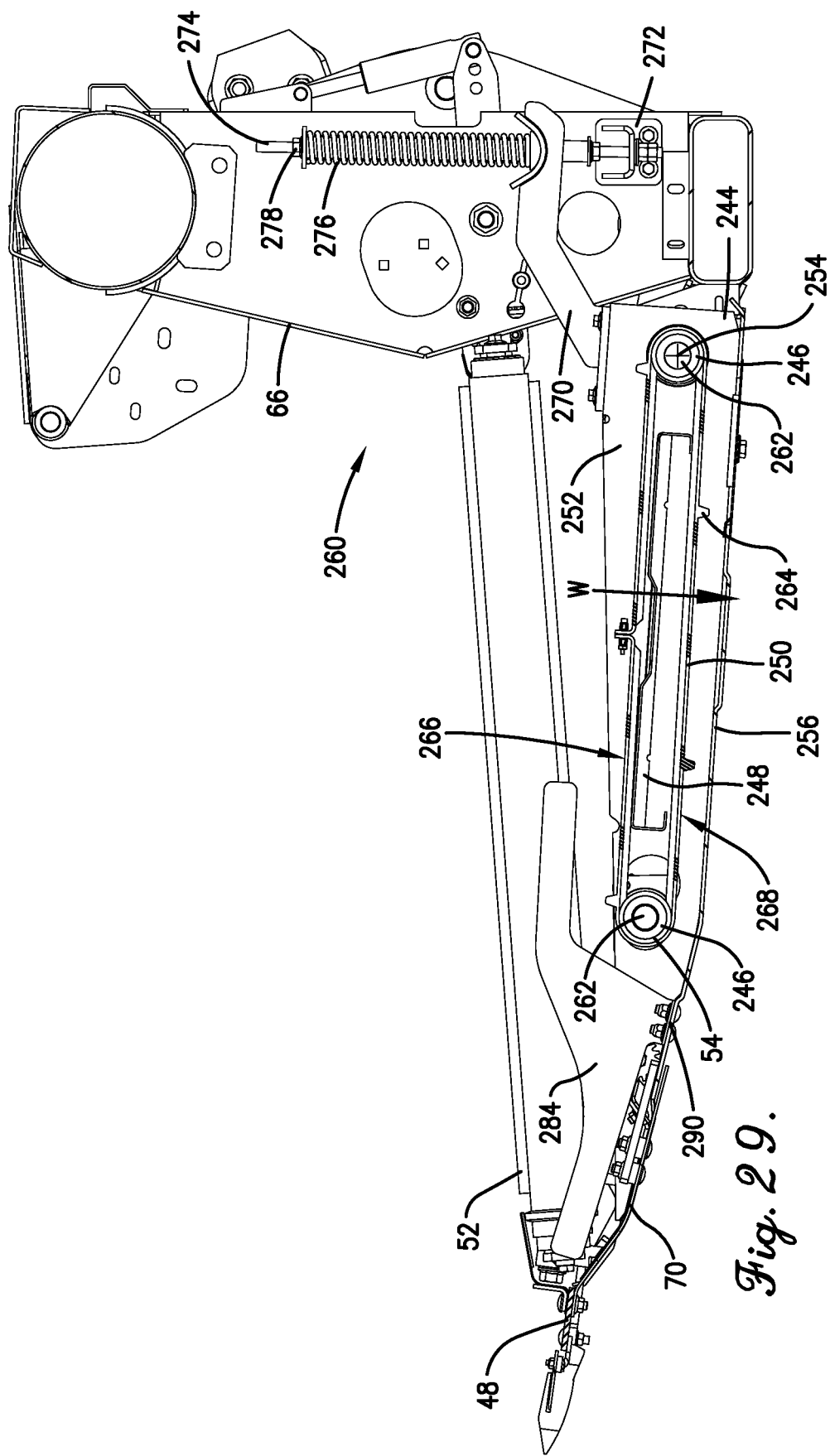
Figure 30:
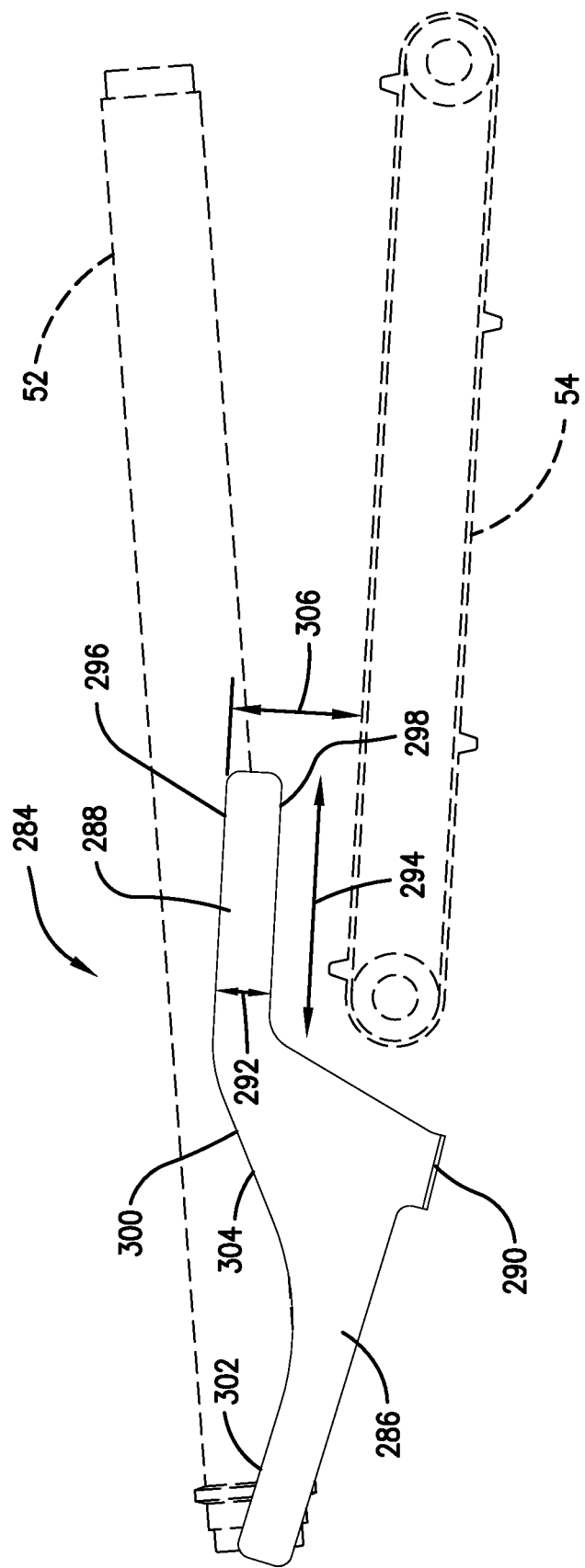
Figure 31:
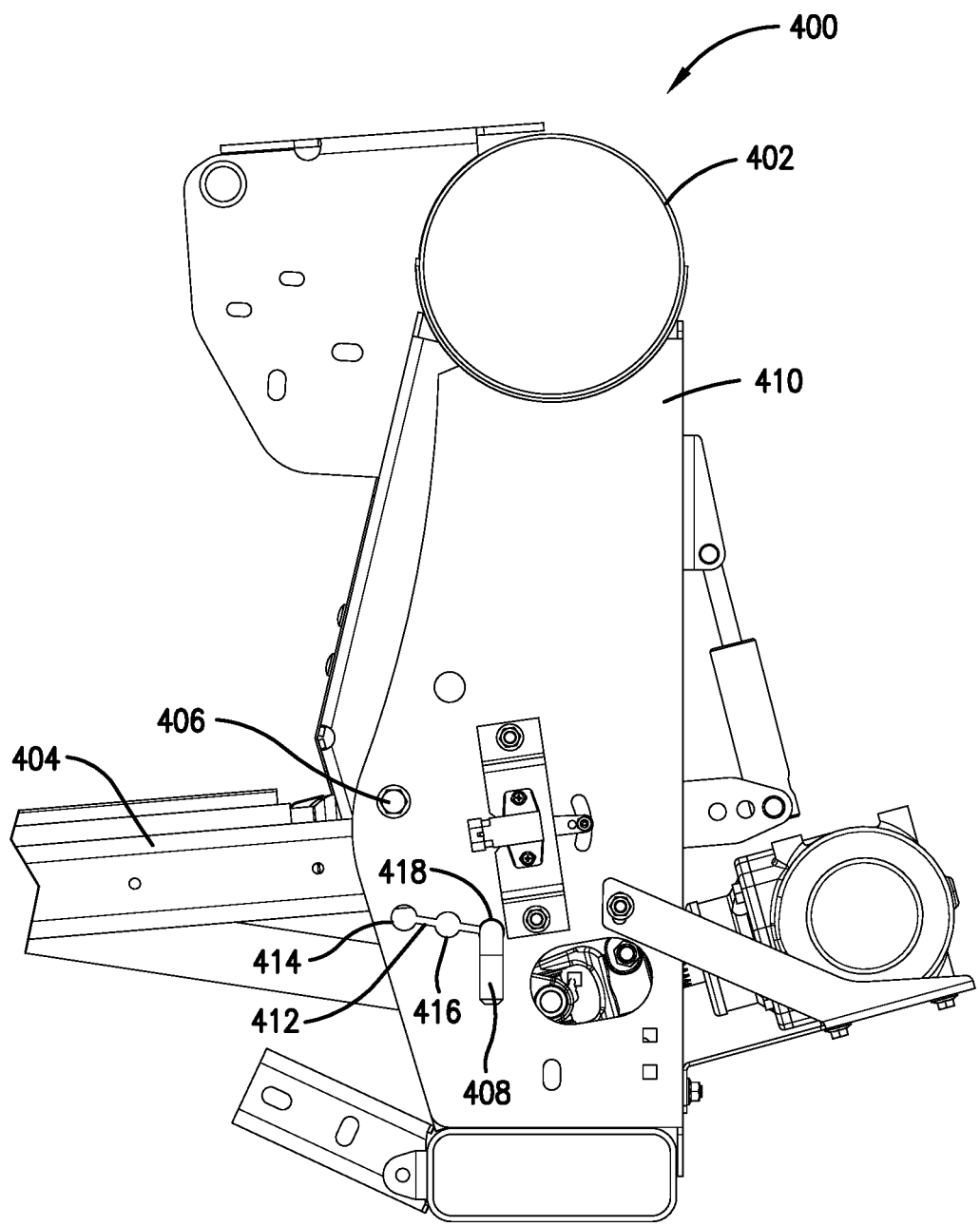
Figure 32:
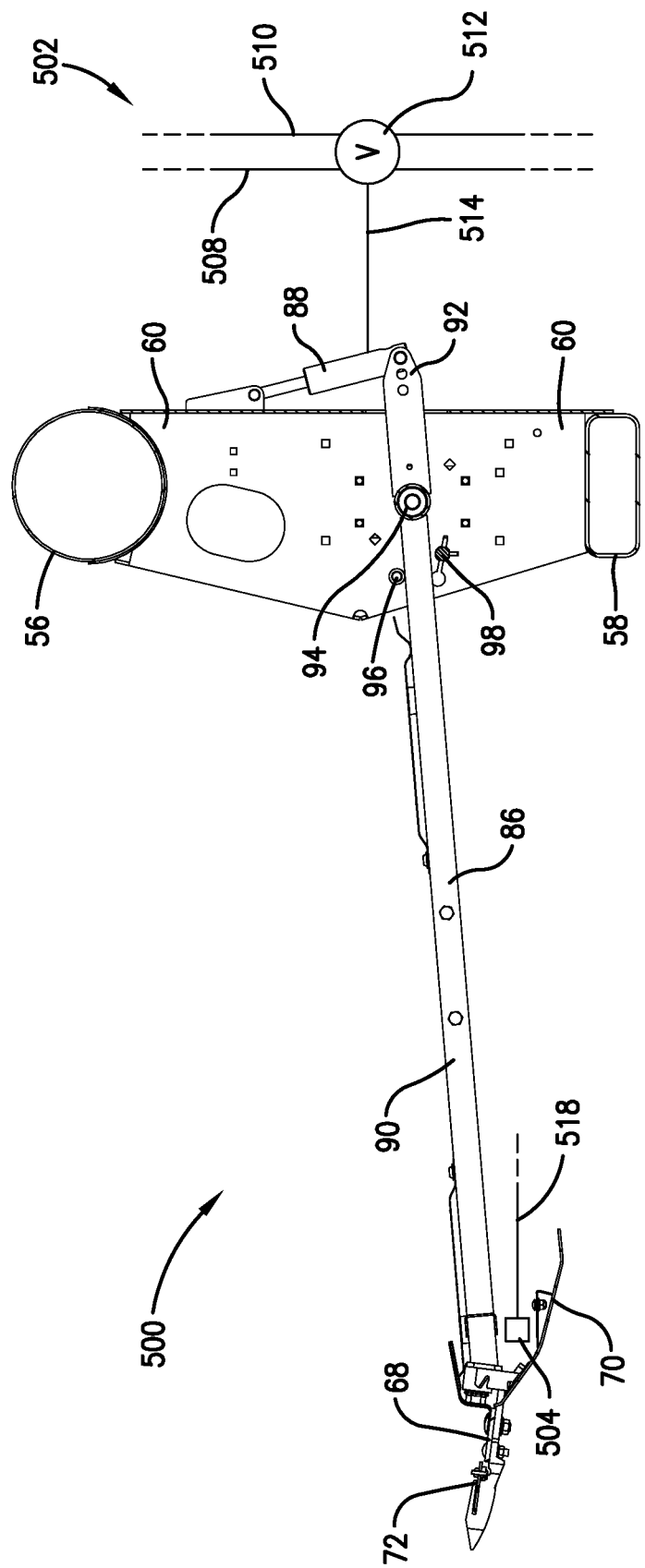
Figure 33:
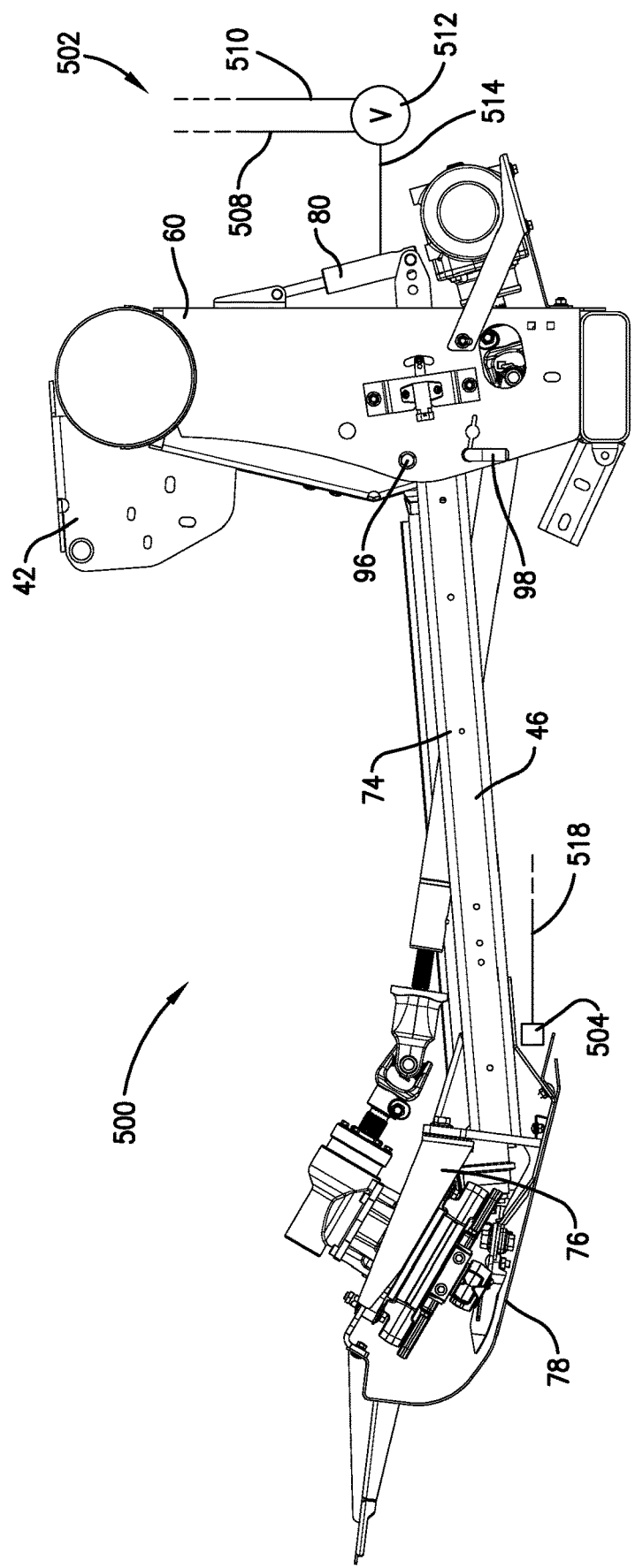

FIG. 3 is an enlarged fragmentary left front perspective view of the harvesting header shown in FIGS. 1 and 2, showing a header frame, draper arms pivotally attached to the header frame and supporting a cutterbar assembly, a left end tilt arm pivotally attached to the header frame and supporting the cutterbar assembly and a cutterbar drive, and a left side draper with a draper belt of the draper assembly removed;

FIG. 4 is an enlarged fragmentary left front perspective view of the harvesting header shown in FIGS. 1-3, showing the end tilt arm pivotally mounted to the header frame and showing pivot adjustment pins attached to the header frame to restrict pivotal movement of the end tilt arm between uppermost and lowermost arm positions, with the illustrated left end tilt arm being in an arm pivoting configuration and in the uppermost arm position;

FIG. 5 is an enlarged fragmentary lower right front perspective view of the harvesting header shown in FIGS. 1-5, showing the left end tilt arm pivotally mounted to the header frame, with the left end tilt arm in the arm pivoting configuration and in the uppermost arm position;

FIG. 6 is a fragmentary left side view of the harvesting header shown in FIGS. 1-5, showing one of the draper arms in the arm pivoting configuration and in the uppermost arm position;

FIG. 7 is a fragmentary left side view of the harvesting header shown in FIGS. 1-6, showing the left end tilt arm in the rigid configuration and in the uppermost arm position, and showing the cutterbar drive supported by the left end tilt arm for up-and-down swinging arm movement, with an epicyclic drive in an uppermost position relative to a rear gearbox;

FIG. 8 is a fragmentary left side view of the harvesting header shown in FIGS. 1-7, showing the left end tilt arm in the arm pivoting configuration and in the uppermost arm position, and showing the laterally extending pivot location of the left end tilt arm;

FIG. 9 is a fragmentary left side view of the harvesting header shown in FIGS. 1-8, showing the left end tilt arm in the arm pivoting configuration and in a lowermost arm position, and showing the epicyclic drive in a lowermost position relative to the rear gearbox;

FIG. 10 is a fragmentary left front perspective view of the harvesting header shown in FIGS. 1-9, showing the left end tilt arm pivotally attached to the header frame and supporting the cutterbar drive, and showing the draper belt of the left side draper;

FIG. 11 is a fragmentary upper right front perspective view of the harvesting header shown in FIGS. 1-10, showing a crop deflector of the left end tilt arm spaced above an outboard end of the left side draper;

FIG. 12 is a fragmentary lower right front perspective view of the harvesting header shown in FIGS. 1-11, showing the left end tilt arm with the cutterbar drive being covered by the crop deflector, showing skid plates of the cutterbar assembly, and showing an end skid of the left end tilt arm;

FIG. 13 is a fragmentary lower left front perspective view of the harvesting header shown in FIGS. 1-12, showing the left end tilt arm with the cutterbar drive being covered by the crop deflector, and showing the skid plates and the end skid;

FIG. 14 is a rear perspective view of the harvesting header shown in FIGS. 1-13, showing an elongated rod of the crop deflector projecting through an opening in an upright panel of the header frame;

FIG. 15 is a fragmentary left rear perspective view of the harvesting header shown in FIGS. 1-14, showing a header sensing system including a pair of left side potentiometers operably coupled to the left end tilt arm and one of the draper arms;

FIG. 16 is a fragmentary right rear perspective view of the harvesting header shown in FIGS. 1-15, showing the header sensing system including a pair of right side potentiometer assemblies operably coupled to a right end tilt arm and another one of the draper arms;

FIG. 17 is an enlarged fragmentary front left perspective view of the harvesting header shown in FIGS. 1-16, showing the potentiometer and linkage of the potentiometer assembly interconnected with a clevis portion of the left end tilt arm;

FIG. 18 is a partly exploded perspective view of the harvesting header shown in FIGS. 1-17, showing the potentiometer and mounting bracket exploded from the header frame and from the left end tilt arm;

FIG. 19 is a schematic view of the header sensing system including the potentiometers and a sensing circuit assembly;

FIG. 20 is a partly exploded perspective right front view of the harvesting header shown in FIGS. 1-18, showing interlocking belt guards of the header in an overhanging relationship to a leading margin of the left side draper;

FIG. 21 is an enlarged fragmentary side view of the harvesting header shown in FIGS. 1-18 and 20, showing the cutterbar assembly and left side draper, with the interlocking belt guards attached to the cutterbar assembly and extending rearwardly to overhang the side draper belt and to extend adjacent to a crop-retaining rib of the side draper belt;

FIG. 22 is a front perspective view of a pair of belt guards shown in FIG. 20, showing the belt guards in an interlocking configuration;

FIG. 23 is a cross-sectional view of the pair of belt guards taken along line 23-23 in FIG. 22;

FIG. 24 is a rear perspective view of the pair of belt guards shown in FIGS. 20, 22, and 23, showing underlying tabs of each of the belt guards positioned in an underlying relationship to the opposite belt guard;

FIG. 25 is a fragmentary left front perspective view of the harvesting header shown in FIGS. 1-18 and 20-21, showing a center draper of the harvesting header spaced between left and right side drapers;

FIG. 26 is a left rear fragmentary perspective view of the harvesting header shown in FIGS. 1-18, 20-21, and 25, showing a counterbalance mechanism of the center draper positioned adjacent to a rear end of the center draper;

FIG. 27 is a top fragmentary view of the harvesting header shown in FIGS. 1-18, 20-21, and 25-26, showing the sliding interconnection between the center draper and the cutterbar assembly, and showing the side drapers in an overlapping relationship with the center draper;

FIG. 28 is a partly exploded right front fragmentary view of the harvesting header shown in FIGS. 1-18, 20-21, and 25-27, showing a central guard and a reinforcing brace of the header exploded away from a central section of the cutterbar assembly, with the central section being spaced in front of the center draper and with the central section extending between laterally outermost margins of the center draper;

FIG. 29 is a left side cross-sectional view of the harvesting header shown in FIGS. 1-18, 20-21, and 25-28, showing the center draper and a center crop deflector spaced forwardly of the center draper, and showing the center draper spaced below the right side draper, and also showing the counterbalance mechanism of the center draper, with the center draper projecting forwardly therefrom;

FIG. 30 is a fragmentary side view of the harvesting header shown in FIGS. 1-18, 20-21, and 25-29, showing the position of the center crop deflector relative to the center draper and relative to the right side draper;

FIG. 31 is a fragmentary side view of a harvesting header constructed in accordance with a second embodiment of the present invention;

FIG. 32 is a fragmentary left side view of a harvesting header constructed in accordance with a third embodiment of the present invention, showing one of the draper arms having a load sensor and a hydraulic adjustment mechanism; and FIG. 33 is a fragmentary left side view of the harvesting header of FIG. 32, showing one of the tilt arms having the load sensor and the hydraulic adjustment mechanism; and FIG. 34 is a fragmentary left rear perspective view of the harvesting header of FIGS. 32 and 33, showing the hydraulic adjustment mechanism.

The figures are not intended to limit the present invention to the specific embodiments they depict. The drawings are not necessarily to scale.

DETAILED DESCRIPTION

The following detailed description of embodiments of the invention references the accompanying figures. The embodiments are intended to describe aspects of the invention in sufficient detail to enable those with ordinary skill in the art to practice the invention. Other embodiments may be utilized and changes may be made without departing from the scope of the claims. The following description is, therefore, not limiting. The scope of the present invention is defined only by the appended claims, along with the full scope of equivalents to which such claims are entitled.

In this description, references to "one embodiment," "an embodiment," or "embodiments" mean that the feature or features referred to are included in at least one embodiment of the invention. Separate references to "one embodiment," "an embodiment," or "embodiments" in this description do not necessarily refer to the same embodiment and are not mutually exclusive unless so stated. Specifically, a feature, component, action, step, etc. described in one embodiment may also be included in other embodiments, but is not necessarily included. Thus, particular implementations of the present invention can include a variety of combinations and/or integrations of the embodiments described herein.

Broadly, embodiments concern a flexible harvesting header having multiple sections supported by support arms, with the height of each support arm being adjustable in response to changing loads. Turning initially to FIGS. 1 and 2, a harvesting header may include a flexible header 40 and a header height sensing system 41. The harvesting header may form part of a harvesting combine, and the header 40 may be configured for cutting and collecting a crop by being advanced in a generally forward direction D so that the crop can be fed to a feeder house (not shown) and further processed by other components (not shown) of the harvesting machine to produce grain. However, at least some aspects of the present invention could be used in other machines, such as a swather or mower.

The header 40 may broadly include a header frame 42, draper arm assemblies 44, end tilt arm assemblies 46, a cutterbar assembly 48, and a draper assembly 50 which may include side drapers 52 and a center draper 54. The header 40 may also include a central collecting auger 55 spaced rearwardly of the center draper 54 and a reel (not shown) that extends the length of the header frame 42 and is configured to direct upstanding crop into the header 40. The cutterbar assembly 48 and draper assembly 50 may be flexible so that the header 40 is configured to closely follow an undulating ground contour. However, for some aspects of the present invention, the cutterbar assembly 48 may be substantially inflexible, i.e., the cutterbar assembly 48 may be rigidly mounted relative to the header frame 42. Similarly, there are aspects of the present invention in which one, more, or all of the drapers 52,54 may be substantially inflexible relative to the header frame 42.

Turning to FIGS. 1-3, the header frame 42 may include an upper beam assembly 56 extending across the entire width of header 40, and a lower beam assembly 58 that likewise extends across the full width of header 40. The header frame 40 may further include a number of upright channels 60 that interconnect beam assemblies 56,58 along the back of header 40 at spaced locations thereacross. Yet further, the header frame 40 includes an end frame member 62 (see FIG. 20) and upright rear panels 64 (see FIGS. 1 and 10) attached along the front side of channels 60. The rear panels 64 may cooperatively define an upright rear wall of the header 40, with a centrally located opening 66 (see FIG. 29) being defined by the rear wall and serving as a crop outlet from header 40 to the feeder house (not shown) of the harvester machine upon which header 40 is mounted. Thus, the opening 66 may be spaced between left and right sides of the header 40, when the header 40 is viewed from behind, and the opening 66 may be centrally located on the header 40.

Turning to FIG. 6, the cutterbar assembly 48 may broadly include a cutterbar 68, skid plates 70, and a sickle assembly 72. The cutterbar 68 may include a substantially continuous and flexible bar that extends lengthwise along substantially the entire width of the header 40 and thereby extends in a lateral direction relative to the normal direction of travel of the header 40. The skid plates 70 may each comprise formed pieces of sheet metal that are secured to a lower side of the cutterbar 68 and are spaced along the length of the cutterbar 68 (see FIG. 5). The underside of each skid plate 70 may be covered with a low friction material (e.g., a panel formed of ultra-high molecular weight polyethylene), if desired. The skid plates 70 may be spaced apart from one another so as to permit flexing movement of the cutterbar assembly 68. In the usual manner, the sickle assembly 72 may be slidably mounted on the cutterbar 68 for severing the crop. As will be discussed further, the cutterbar assembly 48 may be operably coupled to the header frame 42 and to drapers 52,54 to cut the crop so that severed crop material falls onto one of the drapers 52,54. Furthermore, severed crop material that falls onto the side drapers 52 may be carried by the side drapers 52 onto the center draper 54, which carries crop material rearwardly toward the opening 66.

Adjustable Cutterbar Travel Range for a Flexible Cutterbar Header

Turning to FIGS. 3-9, upright channels 60 may each carry a number of arm assemblies 44,46 that project forwardly therefrom, with the arm assemblies 44,46 cooperatively supporting the cutterbar assembly 48, as will be discussed in greater detail. The end tilt arm assembly 46 may includes, among other things, a tilt arm 74, a drive bracket 76, an end skid 78, and a spring 80. The tilt arm 74 may present opposite front and rear ends, with the drive bracket 76 and end skid 78 being attached to the front end. The tilt arm 74 may include an arm portion 81 and a clevis portion 82 that forms the rear end and a pivot bushing 84 positioned between the ends. The tilt arm 74 may be pivotally mounted to the corresponding channel 60 to pivot about a laterally extending axis, with a bolt that extends through the channel 60 and the pivot bushing 84 to secure the tilt arm 74. The spring 80 may be attached to a bracket mounted to the channel 60 and the clevis portion 82, and may be configured to urge the rear end of tilt arm 74 downwardly in order to counterbalance loads applied adjacent the front end.

The draper arm assembly 44 may include a draper arm 86 with front and rear ends and a spring 88. The draper arm 86 may include an arm portion 90 and a clevis portion 92 that forms the rear end, with a pivot bushing 94 positioned between the ends. The draper arm 86 may be pivotally mounted to the corresponding channel 60 to pivot about a laterally extending pivot axis, with a bolt extending through the channel 60 and the pivot bushing 94 to secure the draper arm 86. The spring 88 may be attached to a channel bracket and to the clevis portion 92, and may be configured to urge the rear end of draper arm 86 downwardly in order to counterbalance loads applied adjacent the front end. In one implementation, the springs 80,88 may each include a hydraulic cylinder that is fluidly coupled to a hydraulic system (not shown) that permits the cylinder to operate as a spring (e.g., where the springs 80,88 are fluidly coupled to a gas-charged accumulator). However, it is also within the scope of the present invention for the springs 80,88 to include a conventional mechanical spring such as a coil spring. As will be discussed further, the draper arm assemblies 44 may cooperatively support the side drapers 52.

The arm assemblies 44,46 may be pivotally mounted and cooperatively support the cutterbar assembly 48 so that the cutterbar assembly 48 is configured to flex relative to the header frame 42 along the entire length thereof. Alternatively, the arm assemblies 44,46 may be constructed to permit flexing movement of the cutterbar assembly 48 (e.g., where the arm assemblies 44,46 are slidably attached to the header frame 42 and slidable along an upright direction) without departing from the scope of the present invention. The supporting arm assemblies 44,46 may be configured to be selectively pivotal to provide flexible and non-flexible header configurations, as will be discussed. In particular, the header 40 may include threaded pins 96 and quick-release pins 98. The threaded pins 96 may each be secured above the respective arm assembly 44,46 to restrict upward pivotal movement thereof. The quick-release pins 98 may be removably received within corresponding openings 100 presented by the channels 60. The openings 100 may be generally spaced forwardly of the corresponding arm pivot axis and present a pair of pin-receiving sections that define discrete locked and unlocked locations 102,104 for receiving the quick-release pins 98. The quick-release pins 98 may be located below the corresponding arm assembly 44,46 to restrict downward pivotal movement thereof. Alternatively, other types of pins may be used to restrict pivotal arm movement. Furthermore, other types of stop mechanisms could be used to selectively provide limited arm movement without departing from the scope of the present invention. For example, the pins 96,98 could be mounted on the arm assemblies 44,46, with the channels 60 presenting pin engaging surfaces and with pins 96 or 98 being selectively positionable among locations on the arm to provide selective pivoting movement.

Each tilt arm 74 and draper arm 86 may include a single arm, but could alternatively take another form, such as a four-bar linkage as shown in U.S. Patent Publication No. 2007/0193243, published Aug. 23, 2007, entitled COMBINE HARVESTER DRAPER HEADER HAVING FLEXIBLE CUTTERBAR, which is hereby incorporated in its entirety by reference herein.

Turning to FIGS. 7-9, the arm assemblies 44,46 may be configured to shift between an uppermost fixed position and a lowermost position. In the uppermost fixed position, the quick-release pin 98 may be selectively secured in the locked location 102 so that the arm assembly 46 is in a rigid arm configuration and is restricted from pivoting, with the header 40 thereby being in the non-flexible header configuration. With the quick-release pin 98 secured in the unlocked location 104, the arm assembly 46 may be in an arm pivoting configuration and may be permitted to pivot through a limited range of angular movement, with the cutterbar assembly 48 having a corresponding range of generally vertical movement, so that the header 40 may be in the flexible header configuration. The cutterbar assembly 48 may have a range of vertical movement of about eight (8) inches, but it is within the scope of the present invention that the range of vertical movement may be greater or smaller. Flexible Draper and Cutterbar with Tilt Arm for Cutterbar Drive Turning to FIGS. 10-14, each of the end tilt arm assemblies 46 may be pivotally mounted adjacent to opposite ends of the header frame 42 and may be supported for selective pivotal movement. As discussed above, the arm assemblies 44,46 may be attached to and cooperatively support the cutterbar assembly 48. The cutterbar 68 may be flexible and support the sickle assembly 72. In particular, the sickle assembly 72 may include a split sickle that includes a pair of flexible sickle bars 106 and knives 108 that may be attached to and spaced along the length of the flexible sickle bars 106. The sickle assembly 72 may also include knife guards 110 attached to the cutterbar 68, with the sickle bars 106 and knives 108 being configured to slide in a reciprocating manner relative to the cutterbar 68 and flex with the cutterbar 68. The sickle bars 106 may reciprocate in opposite directions relative to one another. Alternatively, the cutterbar assembly 48 may include a single continuous sickle bar. Again, the cutterbar 68 may also support the spaced-apart skid plates 70 that extend below the cutterbar 68 and are configured to engage the ground and thereby cause flexing movement of the cutterbar 68.

Turning to FIGS. 8-14, the header 40 may further include a pair of cutterbar drive assemblies 112 that may be attached to respective ones of the end tilt arm assemblies 46 and serve to power the sickle assembly 72. The cutterbar drive assembly 112 may broadly include a gear drive 114, a telescopic drive shaft 116, universal joints 118, and a forward gear box in the form of epicyclic drive 120.

The epicyclic drive 120 may include a gear box with input and output shafts 122,124, with the output shaft 124 being drivingly attached to a corresponding one of the sickle bars 106. The epicyclic drive 120 may serve to offset the inertial forces of the sickle during its abrupt acceleration and deceleration at opposite ends of its path of travel. Alternatively, another type of drive could be used to transfer power to the sickle bar 106. Additional details of the epicyclic drive 120 are disclosed in issued U.S. Pat. No. 7,121,074, issued Oct. 17, 2006, entitled BALANCED EPICYCLIC SICKLE DRIVE, which is hereby incorporated in its entirety by reference herein.

The epicyclic drive 120 may be attached to the drive bracket 76 so as to be fixed to the end tilt arm assembly 46 and be pivotal about a laterally extending axis therewith. The gear drive 114 may include input and output shafts 126,128 (see FIG. 5), and may be mounted to the header frame 42 with bracket 130. The telescopic drive shaft 116 is drivingly connected to the input shaft 122 of the drive 120 and the output shaft 128 of the drive 114 with universal joints 118, with the telescopic drive shaft 116 extending through an opening in the tilt arm 74. The input shaft 126 of gear drive 114 may be powered by a power take-off shaft (not shown) of the harvesting machine. In this manner, the shaft-driven cutterbar drive assembly 112 may power the sickle assembly 72. Alternatively, another type of transmission, e.g., a belt drive, or hydraulic drive, for transmitting power to the epicyclic drive 120 and to the sickle assembly 72 may be used.

The drive assembly 112 may be attached to and partly supported on the end tilt arm assembly 46, with the epicyclic drive 120 and telescopic drive shaft 116 being configured to pivot with the end tilt arm assembly 46. In particular, the universal joints 100 may permit relative pivotal movement between the epicyclic drive 120 and the gear drive 114. Furthermore, the telescopic drive shaft 116 may permit relative lateral movement between the drives 114,120. Although the drive assembly 112 is shown attached to the end tilt arm assembly 46, the drive assembly 112 may alternatively be attached to an inboard pivotal arm, such as one of the draper arm assemblies 44.

In addition, the end skid 78 of the end tilt arm assembly 46 may be spaced apart from the adjacent skid plate 70. In this manner, the end tilt arm assembly 46 may be configured to shift relative to the inboard adjacent draper arm assembly 44 while the adjacent arm assemblies 44,46 cooperatively support the cutterbar assembly 48. Thus, the arm assemblies 44,46 may be configured to substantially independently pivot with the cutterbar assembly 48 when the header 40 is advanced over uneven terrain.

The illustrated orientation and configuration of the cutterbar drive assembly 112 may provide a substantially smooth constant rotational velocity of the output shaft 124. In particular, the epicyclic drive 120 may be spaced above an axis of the tilt arm 74 and the gear drive 114 may be spaced below the tilt arm axis, with the drive shaft 116 extending through the tilt arm opening. The output shaft 128 of the gear drive 114 may rotate at a uniform rotational velocity and drive the universal joint 100, which drives the drive shaft 116. However, due to the angle between the output shaft 128 and the drive shaft 116, the universal joint 100 may drive the drive shaft 116 at a non-uniform rotational velocity. The input shaft 122 of the epicyclic drive 120 may be angled relative to the drive shaft 116 at an angle $\alpha$ and the output shaft 128 of the gear drive 114 is angled relative to the drive shaft 116 at an angle $\beta$ (see FIG. 9). However, the illustrated arrangement of drives 114,120 and the drive shaft 116, with the illustrated angles $\alpha$, $\beta$ therebetween, the use of a universal joint 100 between the drive shaft 116 and drive 120 may unsubstantially cancel out any non-uniformity in the rotational velocity so that the output shaft 124 provides a uniform rotational velocity. The cutterbar drive assembly 112 may pivot so that the angle $\alpha$ lies within an angular range. The angle $\beta$ may generally fall within that angular range so that the rotational velocity of the output shaft 124 remains substantially uniform as the cutterbar drive assembly 112 is operated.

Flexible Draper and Cutterbar Having Shiftable Crop Divider with Deflector

Turning to FIGS. 3, 10-14, and 25-26, the header 40 may include side drapers 52 and center draper 54 that are both positioned behind the cutterbar assembly 48. As will be discussed further, the side drapers 52 may be spaced on either side of the center draper 54 and configured to direct severed crop material from locations along the cutterbar assembly 48 to the center draper 54. Each side draper 52 may broadly include oppositely spaced inboard and outboard rollers 132,134, belt support panels 136, a side draper belt 138, and a belt tensioning mechanism 140.

Each of the rollers 132,134 may be rotatably mounted to a corresponding draper arm assembly 44. In particular, the inboard rollers 132 may be rotatably mounted to the draper arm assemblies 44 with brackets 142 and thereby extend adjacent a respective laterally outermost side margin of the center draper assembly 54 (see FIG. 25). The outboard rollers 134 may be rotatably and slidably mounted to respective draper arm assemblies 44 with the belt tensioning mechanism 140. The belt tensioning mechanism 140 may include slides 144 that interconnect and permit relative sliding movement between the draper arm 86 and the roller 134 for tensioning the side draper belt 138. The rollers 132,134 may be mounted so as to pivot with the respective draper arm assemblies 44 about the lateral arm pivot axis.

The belt support panels 136 may be elongated metal strips that extend laterally between the rollers 132,134. The belt support panels 136 may be cooperatively supported by respective draper arm assemblies 44 and serve to evenly support the weight of the side draper belt 138 and any severed crop material on the side draper belt 138. As will be discussed in greater detail, the side draper belt 138 may be an endless belt that is particularly configured for conveying the severed crop material toward the center draper 54. The side draper belt 138 may be rotatably mounted to surround the rollers 132,134 and the corresponding draper arm assemblies 44, with the side draper belt 138 presenting opposite endmost margins defined by the rollers 132,134. Furthermore, the side draper belt 138 may present upper and lower runs, with the upper run extending over the belt support panels 136 so that the panels 136 restrict the upper run from sagging. The lower run of the side draper belt 138 may extend below the panels 136. The outboard roller 134 may be powered by a drive (not shown), with the outboard roller 134 driving the side draper belt 138 so that an upper run of the side draper belt 138 moves inwardly toward the center draper 54. While the illustrated embodiment includes left and right side drapers 52, an alternative conveyor mechanism may be used. For example, multiple end-to-end side drapers could be used to convey crop material. Also, a conventional auger conveyor could be used in some of the inventive aspects to convey crop material.

Turning to FIGS. 11-14, the end tilt arm assembly 46 may further include a crop divider 146 that serves to direct crop into the header 40 and deflect severed crop material onto the side draper 52. The crop divider 146 may operate as a substantially unitary structure and includes a divider panel 148 that presents front and rear ends, an end bracket 150 that secures a forwardmost tip of the divider panel 148 to an arm bracket 152 of the end skid 78, and an elongated support 154 that is fastened to an underneath surface of the divider panel 148 and extends rearwardly from the rear end of the divider panel 148.

The divider panel 148 may also include inner and outer walls 156,158 joined along a top margin of the divider panel 148 to cooperatively form a hollow body, with the inner wall 156 including an upright section 160 and a deflector section 162 that is angled relative to the upright section 160. The inner wall 156 may also present a lowermost margin 164 that extends between the front and rear ends of the divider panel 148. The walls 156,158 may extend rearwardly from the forwardmost tip of the divider panel 148, with the walls 156,158 cooperatively presenting a generally expanding wall structure in the rearward direction.

The elongated support 154 may include a rod section that is shiftably received in an opening 166 presented by one of the upright rear panels 64. Thus, the front end of the divider panel 148 may be supported by the end skid 78, with the rear end being supported by the header frame 42 so that the rod section can pivot and slide relative to the header frame 42. As the end tilt arm assembly 46 pivots up or down, the crop divider 146 may also pivot in the same direction.

Furthermore, the divider panel 148 may be positioned so that the lowermost margin 164 is spaced apart from the adjacent side draper belt 138 as the end tilt arm assembly 46 pivots between the uppermost and lowermost positions. The divider panel 148 may be positioned to extend over part of the side draper belt 138 and encourage severed crop material to fall onto the side draper belt 138. In addition, the divider panel 148 may be spaced to permit sliding adjustment of the outboard roller 134, e.g., for tensioning or maintenance of the side draper belt 138.

Header Height Control System with Multiple Potentiometer Input

Turning to FIGS. 15-19, the header height sensing system 41 may provide feedback to a header height adjustment system (not shown) for controlling the height of the header 40. The header height sensing system 41 may include a plurality of potentiometer assemblies 168 and an electronic module 170 that are operably coupled to one another, with the potentiometer assemblies 168 being operably coupled to respective arm assemblies 44,46. The potentiometer assemblies 168 may each include a potentiometer 172, a mounting bracket 174, and a linkage 176. In the usual manner, the potentiometer 172 may include a sensor arm 178 that pivots to control the voltage output of the potentiometer 172. The potentiometer 172 may be attached to a corresponding channel 60 adjacent to the pivot of the arm assembly 44,46 using the mounting bracket 174. The linkage 176 may directly interconnect the sensor arm 178 and the clevis portion 92, with the potentiometer 172 providing an output signal associated with the angular position of the arm assembly 44,46. The arm position signal may also be associated with the generally vertical position of a portion of the cutterbar assembly 48 adjacent a forward end of the arm assembly 44,46. As the arm assembly 44,46 may swing upwardly or downwardly, the linkage 176 causes the sensor arm 178 to swing accordingly, with the arm position signal, i.e., the voltage output, of the potentiometer 172 changing accordingly. In this manner, the potentiometer 172 may be configured to sense movement of the adjacent portion of the cutterbar assembly 48 as the header 40 moves over uneven terrain.

For each of the arm assemblies 44,46 having a potentiometer 172 to sense pivotal arm movement and provide an arm position signal, the potentiometer 172 may only be coupled to sense movement of that particular arm. Alternatively, the movement of multiple arm assemblies 44,46 may be sensed by the same transducer. While the potentiometer 172 may be for sensing angular movement of the arm assembly 46, other types of transducers may be used to sense angular arm movement, such as an angular encoder.

Four potentiometers 172a,172b,172c,172d may be installed on the header 40 to sense angular arm movement of respective arm assemblies 44,46 and provide corresponding arm position signals, with two potentiometers 172a,172b on the left side of the header 40 and two potentiometers 172c,172d on the right side of the header 40 (see FIGS. 15 and 16). For each side of the header 40, one potentiometer 172 may be installed to sense movement of the end tilt arm assembly 46 and provide a corresponding end tilt arm position signal, and another may be installed to sense movement of an inboard one of the draper arm assemblies 44 and to provide a corresponding draper arm position signal. Alternatively, other sensing configurations may be used. For example, more than two potentiometers 172 could be installed on each side of the header 40. For another example, three (3) potentiometers 172 could be installed on each side of the header 40, with one associated with the end tilt arm assembly 46 and two associated with corresponding draper arm assemblies 44. Furthermore, a plurality of sensors could be installed so that each arm assembly 44,46 has a respective potentiometer 172 associated therewith, with the system 41 thereby being configured to sense the angular arm movement of all of the arm assemblies 44,46 and provide arm position signals corresponding to the position of the arm assemblies 44,46.

Turning to FIG. 19, the electronic module 170 may be configured to provide an output signal to the harvesting machine for controlling the header height when the header 40 is in the flexible header configuration. As will be discussed, the electronic module 170 may provide the output to indicate when a controller (not shown) of the harvesting machine should automatically raise the header 40, e.g., by hydraulically raising the feeder house. The electronic module 170 may include a pair of minimum input voltage selector circuits 180. Each selector circuit 180 may include a pair of buffer circuits 182 that each receive an output signal from the corresponding potentiometer 172, with each buffer circuit 182 including resistors 184,186, diodes 188, and operational amplifier 190. The resistors 184 may be 470 k-ohm resistors, the resistors 186 may be 1 k-ohm resistors, the diodes 188 may be 1N4004 diodes, and the operational amplifiers 190 may be TS9241N op amps. The selector circuit 180 may also include selector diodes 192 electrically coupled to the output of respective buffer circuits 182 and each electrically coupled to the input of another operational amplifier 194. The selector circuit may further include pull-up resistors 196 and feedback diode 198. The diodes 192 may be 1N4004 diodes, the operational amplifiers 194 are TS924IN op amps, and the resistors 196 are 220 k-ohm resistors. The module 170 may also include a potentiometer circuit 200 coupled to all of the potentiometers 172, via common nodes 202,204. The circuit 200 may include a zener diode 206 and capacitors 208,210. The capacitor 208 may be a 0.1 microfarad capacitor and the capacitor 210 is a 10 microfarad capacitor.

The arrangement of selector diodes 192 may cooperatively provide a selected voltage signal to the operational amplifier 194 that is substantially the same as the lowest of the output signals received from corresponding potentiometers 172 by the corresponding buffer circuits 182. The operational amplifier 194 may provide an output signal of the corresponding selector circuit 180 that is substantially the same as the selected voltage signal. In this manner, the selector circuit 180 may select the lowest one of analog voltage signals provided by the respective potentiometers 172 and provide a corresponding selected analog output signal at selector output 211. Alternatively, the circuit may provide another signal, e.g., the circuit may select the highest one of the voltage signals and provide a corresponding signal output. Furthermore, the circuit could provide another signal, e.g., a digital signal, that corresponds to a selection of one of the voltage signals provided by the potentiometers 172.

The potentiometers 172 may provide an input voltage to the module 170 that ranges from about 0.5 volts to about three (3) volts based on the position of the arm assembly 44,46 and the corresponding vertical position of the adjacent portion of the cutterbar assembly 48. In particular, the potentiometers 172 may provide a voltage of about three (3) volts corresponding to the arm assembly 44,46 being in the lowermost arm position and about 0.5 volts corresponding to the arm assembly 44,46 being in the uppermost arm position. Again, the cutterbar assembly 48 may have a range of generally vertical travel of about eight (8) inches when the arms swing between the uppermost and lowermost positions. Therefore, vertical movement of the cutterbar assembly 48 through that range of travel may cause the potentiometers 172 to range between about 0.5 volts to about 3 volts.

The module 170 may provide selected signal outputs that correspond to the position of the cutterbar assembly 48. In particular, the potentiometers 172a,172b may be configured to sense the position of a left side section of the cutterbar assembly 48 and the potentiometers 172c,172d may be configured to sense the position of a right side section of the cutterbar assembly 48. Furthermore, the selector circuits 180 may each provide a selector signal associated with the highest position of the arms corresponding to respective potentiometers 172. In this manner, the selector circuits 180 may each provide a single cutterbar position signal associated with the highest vertical position of that section of the cutterbar assembly 48.

The potentiometers 172, module 170, and header height adjustment system may cooperate so that the controller of the harvesting machine automatically raises the header 40 when at least one of the arm assemblies 44,46 pivots above a predetermined angular position. The header height adjustment system may control the header 40 in response to the cutterbar position signals received from the module. When a voltage of one of the potentiometers 172 goes below a threshold level of about 1.5 volts, which voltage corresponds to the cutterbar assembly 48 being positioned approximately four (4) inches from the uppermost position, the controller may raise the header 40. Additionally or alternatively, the output from the module 170 could be used for other purposes, such as triggering a warning indicator for an operator.

Draper Belt with Crop-Retaining Rib

Turning to FIGS. 20 and 21, the side draper belt 138 may include an endless belt that includes a belt body 212 and presents leading and trailing belt margins 214,216. The side draper belt 138 may further include a plurality of fore-and-aft extending crop-engaging slats 218 projecting outwardly from an outer surface of the belt body 212 and extending between the belt margins 214,216. Yet further, the side draper belt 138 may include an endless crop-retaining rib 220 that projects from the outer surface of the belt body 212. The rib 220 may include a cross-sectional shape that is constant along its length and tapers outwardly toward an outermost tip. The rib 220 may project at least about one-half inch from the outer surface of the belt body 212. The crop-retaining rib 220 may endlessly extend adjacent to the leading belt margin 214 so that the rib 220 is spaced between the margin 214 and the slats 218. Alternatively, the side draper belt 138 may be configured to carry crop material. For example, the side draper belt 138 could include a plurality of crop-retaining ribs 220, or the rib 220 could be formed in segments to present discrete rib sections.

The side draper belt 138 may be rotatably received onto the rollers 132,134 so as to define upper and lower belt runs 222,224, with the upper belt run 222 configured to move toward the center draper 54. The arm assemblies 44,46 may be positioned so that the side draper belt 138 slopes downwardly toward the leading belt margin 214. In this manner, any severed crop material supported on the upper belt run 222 may be urged by gravity toward the leading belt margin 214, with the crop-retaining rib 220 being configured to catch the crop material and restrict the crop material from falling off of the upper belt run 222 until the crop material is disposed onto the center draper 54.

Interlocking Belt Guards for a Draper Header

Turning to FIGS. 20-28, the header 40 may further include a flexible belt guard assembly with a central guard 226 and a plurality of interlocking belt guards 228, with the belt guards 228 extending along the leading belt margins 214. Each belt guard 228 may be unitary and include a formed piece of sheet metal that presents opposite first and second ends 230,232. The belt guard 228 may includes a lower flange section 234, an upright section 236, and an upper overhanging section 238, all of which extend substantially from the first end 230 to the second end 232. The belt guard 228 may also include a rear tab 240 projecting from the overhanging section 238 at the first end 230 and a front tab 242 projecting from the upright section 236 at the second end 232. The central guard 226 and an endmost belt guard 243 may also include sections 234,236,238, with the central guard 226 including tabs 242, and the endmost belt guard 243 including a tab 240 on one end thereof.

The belt guards 228 may be configured to be attached to the cutterbar 68 by fasteners that extend through holes in the flange section 234. Pairs of belt guards 228 can be mated to each other by positioning the rear tab 240 of one belt guard 228 underneath the overhanging section 238 of the other belt guard 228. Furthermore, the front tab 242 of the other belt guard 228 may be positioned underneath the upright section 236 of the one belt guard 228. In this manner, each pair of mated belt guards 228 may have mating ends that cooperatively form an interlocking joint so that the mating ends each restrict relative up-and-down movement of the other mating end. However, the interlocking joint may permit relative angular movement between mated pairs of belt guards 228 and also permit a limited amount of relative lateral movement between mated pairs of belt guards 228 in the direction along the leading belt margin 214. In addition, the pairs of mated belt guards 228 may be configured so that uppermost surfaces presented by the overhanging sections 238 are substantially flush with one another and thereby minimize any resistance to crop flow provided by the belt guards 228.

Interlocking Belt Guards and the Crop-Retaining Rib

Turning to FIG. 21, the belt guards 228 may extend rearwardly and upwardly from the cutterbar 68 and extend over the leading belt margin 214. The belt guards 228 may also extend over and adjacent to the crop-retaining rib 220. While the illustrated belt guards 228 and crop-retaining rib 220 are slightly spaced apart, in alternative implementations some sliding contact may occur therebetween. In particular, the overhanging sections 238 may present a downwardly facing surface that extends in close proximity along the tip of the rib 220. The gap between the surface and the tip may be less than about one-quarter of an inch. In this manner, the belt guards 228 and the crop-retaining rib 220 may cooperatively form a joint that restricts severed crop material from falling between the cutterbar 68 and the leading belt margin 214.

Spring Flotation for Center Deck of Draper Header

Turning to FIGS. 25-30, the center draper 54 may serve to collect severed crop material from the side drapers 52 and carry the material in a rearward direction toward the opening 66 and toward the feeder house of the harvesting machine. The center draper 54 may broadly include a draper chassis 244, front and rear rollers 246, belt support 248, and center draper belt 250. The draper chassis 244 may include a pair of side plates 252 that are pivotally mounted to corresponding channels 60 and pivot about pivot axis 254. The draper chassis 244 may further include a floor panel 256 that is connected to and extends along a bottom margin of the side plates 252. Thus, the side plates 252 and floor panel 256 may cooperatively pivot about the pivot axis 254. The illustrated draper chassis 244 presents a lateral width, measured from one side plate 252 to the other, of at least about five (5) feet, or about six (6) feet, but in alternative implementations the draper chassis 244 may be larger or smaller.

The floor panel 256 may also present a forward margin 258 that is secured to the corresponding skid plates 70 with multiple fasteners. In particular, the fasteners may each include a rearwardly extending finger that is spaced upwardly from the skid plate 70 to present an elongated slot, with the finger being attached at a forward end thereof with fasteners. The forward margin 258 may be slidably received within the slot to create a sliding joint that permits relative fore-and-aft sliding movement between the floor panel 256 and the skid plates 70 and restricts relative vertical movement therebetween. The draper chassis 244 may also include a counterbalance mechanism 260 for supporting the center draper 54, as will be discussed further.

The rollers 246 may be rotatably mounted between the side plates 252 by mounting the rollers 246 on respective shafts 262 and by mounting the shafts 262 onto bearings (not shown) secured in the side plates 252. The belt support 248 may be attached to the side plates 252 and is spaced between the rollers 246. The center draper belt 250 may include an endless belt with a belt body and a plurality of crop-engaging slats 264. The center draper belt 250 may present upper and lower runs 266,268. The lower run 268 may extend below the belt support 248 and the upper run 266 may extend above the belt support 248, with the belt support 248 being configured to restrict sagging of the upper run 266. The draper belt 250 may be driven by the rear shaft 262, which is powered by a drive (not shown) so that the upper run 266 is configured to normally move in a rearward direction and the lower run 268 is configured to normally move in a forward direction. Alternatively, the belt rotation direction may be reversed so that the upper run 266 moves forwardly and the lower run 268 moves rearwardly (such that crop is conveyed by the lower run). While the illustrated center draper 54 is centrally located relative to the rest of the header 40, in an alternative implementation the center draper 54 may be located toward one side of the header 40.

Turning to FIG. 29, the counterbalance mechanism 260 may serve to support the center draper 54 by counteracting the weight of the center draper 54 about the pivot axis 254. The counterbalance mechanism 260 may include a lever 270, mounting lug 272, rod 274, and compression spring 276. The lever 270 may be attached to a rear end of the corresponding side plate 252 and extends rearwardly through the opening 66. The mounting lug 272 may be attached to an inner wall of the adjacent channel 60 and is spaced below the lever 270. Adjacent a lower end thereof, the rod 274 may be secured to the mounting lug 272 and extends up through a rear end of the lever 270 and through the spring 276. A stop 278 may be secured adjacent to an upper end of the rod 274, with the spring 276 being captured between the rear end of the lever 270 and the stop 278. Thus, the spring 276 may be configured to bias the lever 270 in a generally downward direction. The generally downward spring force provided by the spring 276 may counteracts the weight W of the center draper 54 so that the spring 276 reduces the load that the center draper 54 applies to the skid plates 70 and to the cutterbar assembly 48.

The center draper 54 may collect severed crop material from the side drapers 52 by being generally spaced below the side drapers 52. Furthermore, inboard ends of the side drapers 52 may overhang corresponding laterally outermost side margins of the center draper 54 so as to restrict crop material from falling between the drapers 52,54 (see FIG. 27).

Draper Head with Flexible Cutterbar Having Rigid Center Section

Turning to FIGS. 25-29, the cutterbar assembly 48 may further include an elongated brace 280 that includes a substantially uniform length of angle iron. Alternatively, another structure may be used with some vertical dimension to resist bending of the cutterbar assembly 48 caused by gravity or other loads. For example, the brace 280 could include an L-shaped beam made from a material other than steel, or a beam having another cross-sectional shape, e.g., a box shape, that serves to rigidify the cutterbar assembly 48. The brace 280 may be positioned to lie on top of the flange section 234 of central guard 226 and engage the upright section 236. Fasteners may secure the brace 280 and central guard 226 to the cutterbar 68 and thereby define an inflexible length 282 of the cutterbar assembly 48 between ends of the central guard 226. In other words, the brace 280 and central guard 226 may cooperatively restrict the cutterbar assembly 48 from bending along the inflexible length 282.

The center draper 54 may include laterally outermost side margins that are spaced so that the inflexible length 282 extends between the margins. The center draper 54, particularly the rollers 246, may flex to only a minimal degree along the length of the cutterbar 68. Therefore, because the illustrated cutterbar assembly 48 is rigid along the inflexible length 282, the front roller 246 and the inflexible length 282 may cooperatively maintain a substantially uniform spacing between a forward end of the draper belt 250 and the cutterbar assembly 48 so that the cutterbar 68 and center draper 54 generally move together with one another. In this manner, the inflexible length 282 may permit the center draper 54 to travel over uneven terrain without parts of the center draper 54, such as the draper belt 250, contacting the side drapers 52 and without the center draper 54 damaging itself.

Center Crop Deflector for Draper Header

Turning to FIGS. 25-30, the center draper 56 may also include a center crop deflector 284 that is substantially unitary and configured to direct crop material from the side drapers 52 so that crop flow from one side draper 52 to the other is restricted. The center crop deflector 284 may include a substantially flat plate with front and rear deflector portions 286,288 and also includes a lower flange 290. The rear deflector portion 288 may present a height 292 of at least about one (1) inch so that the rear deflector portion 288 resists bending relative to the front deflector portion 286. The rear deflector portion 288 may also present a portion length 294 in the range of about one (1) inch to about six (6) inches. The rear deflector portion 288 may present upper and lower edges 296,298 that are substantially linear. The front deflector portion 286 may present an upper edge 300 that includes a lower section 302 that is substantially linear and a curvilinear transition section 304 defined between the lower section 302 and the upper edge 296 of the rear deflector portion 288.

The flange 290 of the center crop deflector 284 may be attached to the forward margin 258 of the floor panel 256, with the front deflector portion 286 extending forwardly up to the cutterbar assembly 48 and the rear deflector portion 288 extending over the draper belt 250. The rear deflector portion 288 may extend over the draper belt 250 a length less than half the length of the upper run 266. The length of extension over the draper belt 250 may range from about one (1) inch to about six (6) inches. Also, the upper edge 296 of the rear deflector portion 288 may be spaced above the draper belt 250 a distance 306 in the range of about three (3) inches to about five (5) inches. The illustrated length of extension over the draper belt 250 and the height of the upper edge 296 relative to the draper belt 250 may permit the center crop deflector 284 to direct the severed crop material while providing minimal restriction to material flow in the aft direction. In addition, the lower edge 298 may be spaced above the draper belt 250 a distance less than about 1.5 inches so that the center crop deflector 284 is restricted from contacting the draper belt 250 while sufficiently restricting crop material from flowing from one side draper 52 to the other. Those of ordinary skill in the art will appreciate that such untoward crop flow is particularly problematic when cutting with only one side of the header 40. For example, when cutting crop only on the left side of the header 40, the left side draper 52 will convey crop material toward the center draper 54. Because the right side draper 52 is conveying little or no crop material toward the center draper 54, the crop material from the left side meets little resistance when reaching the center draper 54 and can continue to flow past the center draper 54 and into the right side draper 52. Therefore, the center crop deflector 284 may serve to provide sufficient resistance so that material deposited from one side draper 52 is restricted from flowing entirely across the center draper 54 to the other side draper 52.

Operation

In operation, the harvesting header may be advanced by the harvesting machine in a field to cut the crop and collect the severed crop material for disposal into a feeder house of the harvesting machine. As the header is advanced in the forward direction, the crop divider 146 of the end tilt arm assembly 46 may define a crop cutting path of the header and push crop along the sides of the path in an inboard direction. At the same time, the cutterbar assembly 48 may sever the crop and the reel (not shown) pushes the severed crop material onto the drapers 52,54. Severed crop material located on the side drapers 52 may be carried inwardly toward and deposited onto the center draper 54. In particular, both the left and right side drapers 52 may carry any crop material inwardly, with the center crop deflector 284 restricting crop flow from one of the side drapers 52 to pass over to the other side draper 52. Crop material on the center draper 54 may be carried in a rearward direction toward the collecting auger 55, and then deposited through the opening 66 and into the feeder house.

The harvesting header may cut and collect crop material in either the flexible header configuration or the non-flexible header configuration by configuring the arm assemblies 44,46 in corresponding arm pivoting and rigid arm configurations. The arms may be placed in the rigid arm configuration by positioning the corresponding quick-release pin 98 into the locked location. With all of the arm assemblies 44,46 in the rigid configuration, the header may be placed into the non-flexible header configuration. In the non-flexible configuration, the header can be advanced through the field so that the cutterbar assembly 48 and drapers 52,54 substantially do not flex relative to the header frame 42. Furthermore, any contact between the ground and the cutterbar assembly 48 will cause substantially no flexing movement of the cutterbar assembly 48 or the drapers 52,54.

Similarly, the arm assemblies 44,46 can be placed in the arm pivoting configurations by positioning the quick-release pin 98 into the unlocked location. The flexible header configuration may be achieved by configuring all of the arm assemblies 44,46 in the arm pivoting configuration. In the flexible header configuration, the header can be advanced through the field so that the cutterbar assembly 48 and drapers 52,54 flex relative to the header frame 42 between lowermost and uppermost positions. Any contact between the ground and the cutterbar assembly 48 may cause the cutterbar assembly 48 and at least one of the drapers 52,54 to flex upwardly relative to the header frame 42, provided that the adjacent arm assemblies 44,46 have not already reached the uppermost position. When the arm assemblies 44,46 pivot upwardly beyond a predetermined arm movement threshold between the lowermost and uppermost positions, a controller of the harvesting machine may sense the threshold condition and raise the header in response to the condition until the arm assemblies 44,46 pivot downwardly below the threshold. The flexible header configuration may be particularly suited for cutting crop close to the ground where some intermittent contact occurs between the header and the ground.

Alternative Embodiment

Turning to FIG. 31, an alternative header 400 is shown constructed in accordance with a second embodiment of the present invention. For the sake of brevity, the description will focus primarily on the differences of this alternative embodiment from the first embodiment described above. The header 400 may include a header frame 402 and an end tilt arm 404 pivotally mounted to the header frame 402. The header 400 may further include fixed and adjustable pins 406,408 that are attached to an upright 410 of the header frame 402. The upright 410 may present an opening 412 that includes three discrete pin-receiving sections that define locked locations 414 and unlocked locations 416,418, each of which is configured to receive the adjustable pin 408 so that the pin can be selectively positioned in one of the locations. The unlocked locations 416,418 may provide two distinct lowermost arm positions that correspond with distinct ranges of angular arm movement. Thus, the unlocked location 418 may permit a full range of angular arm movement of the end tilt arm 404, while the unlocked location 416 may permit a range of movement that is about half of the full range of angular arm movement provided by location 418. The locked location 414 may serve to provide an uppermost arm position that corresponds with a locked arm position, with substantially no range of angular arm movement being permitted. Each of the support arms of the illustrated header 400 may have a similar stop arrangement that provides similar locked and unlocked locations.

Draper Header with Flexible Cutter Bar and Sectional Height Adjustment

Turning to FIGS. 32-34, an alternative header 500 is shown constructed in accordance with a third embodiment of the present invention. For the sake of brevity, the description will focus primarily on the differences between this third embodiment from the embodiments described above. As such, except as noted, the components and their functions may be substantially similar or even identical to the corresponding components described above, and the same reference numerals will be used when appropriate.

The header 500 may broadly include the header frame 42, the draper arm assemblies 44, the end tilt arm assemblies 46, the cutterbar assembly 48, and the draper assembly 50. The cutterbar assembly 48 and the draper assembly 50 may be flexible so that the header 40 is able to follow an undulating ground contour. The draper arm assembly 44 may include the supportive draper arm 86 having front and rear ends, the skid 70 associated with the front end, and the hydraulic cylinder 88 associated with the rear end. The end tilt arm assembly 46 may include the supportive tilt arm 74 having front and rear ends, the end skid 78 associated with the front end, and the hydraulic cylinder 80 associated with the rear end. In contrast to the forgoing embodiments, the hydraulic cylinders 80,88 may operate not only as passive springs but may also be independently actuatable in reaction to changes in the loads, or vertical forces, on the front ends of the arms 74,86 to apply offsetting vertical forces on the rear ends of the arms 74,86 in order to raise and lower the front ends of the support arms in order to facilitate more closely and consistently maintaining a desired ground pressure.

More specifically, the header 500 may further include a hydraulic assembly 502, a plurality of load sensors 504, and a controller 506. The hydraulic assembly 502 may be configured to actuate some or all of the hydraulic cylinders 80,88, and may include a pressure line 508, a return line 510, a plurality of valves 512, and a plurality of valve lines 514. Hydraulic fluid may be added (from a reservoir, not shown) via the pressure line 508 to increase hydraulic pressure, and may be removed (to the reservoir) via the return line 510 to decrease hydraulic pressure. Each valve 512 may be coupled with the pressure and return lines 508,510, and may be further coupled with a respective hydraulic cylinder 80,88 via a respective valve line 514, and may be openable to allow hydraulic fluid in a respective hydraulic cylinder 80,88 to move into or out of the cylinder 80,88 via the valve line 514. Increasing or decreasing hydraulic fluid pressure in a particular hydraulic cylinder 80,88 may, respectively, raise or lower the front end of the respective support arm.

The load sensors 504 may be provided at the front ends of some or all of the support arms 74,86, and each load sensor 504 may sense a changing load (e.g., an increasing load due to an accumulation of crop material) in front of or on the skid plate 70,78 or other portion of the front end, and may generate and send an electronic load signal via a sensor signal line 518 reporting the change in load. The load sensors 504 may be employ substantially any suitable technology, such as piezoelectric, hydraulic, or pneumatic technologies.

The controller 506 may be configured to receive the load signals from the load sensors 504, determine whether actuating one or more of the hydraulic cylinders 80,88 is warranted, and if so, accordingly increase or decrease the hydraulic fluid pressure to the hydraulic cylinders 80,88 to raise or lower the front ends of the respective support arms 74,86. In one implementation, determining whether actuating one or more of the hydraulic cylinders 80,88 is warranted may involve determining whether the change in load on the front ends of the support arms 74,86 exceeds a pre-determined changing load value. The pre-determined changing load value may be a numerical value or a percentage value (of, e.g., five (5) percent or more, or ten (10) percent or more) above or below a current load setting of the hydraulic cylinders 80,88. For example, if the pre-determined changing load value is five (5) percent, and the load sensors 504 report an increase in load of seven (7) percent, then the controller 506 may increase the hydraulic pressure in the hydraulic cylinders 80,88 to raise the front ends of the support arms 74,86 to, e.g., pass over an accumulation of crop material which created the increased load. In various implementations, some or all of the arms 74,86 may be provided with the actuatable hydraulic cylinder 80,88, some or all of the arms 74,86 may be provided with the load sensors 504, and/or the controller 506 may be configured to actuate the hydraulic cylinders 80,88 individually, as a subgroup, and/or all at once. For example, in some embodiments, multiple ones of the arms 74,86 may be raised and lowered by a single cylinder (or cooperatively by an plurality of cylinders that are different in number than the arms).

In one implementation, when the header 500 is being raised off the ground, the controller 506 may receive the raise command, determine that the raise command exceeds a pre-determined time period (of, e.g., less than five (5) seconds, or less than one (1) second), and if so, increase the hydraulic pressure in each hydraulic cylinder 80,88 to raise the guard tips at the front ends of the support arms 74,86 and thereby reduce the risk of the header digging into the soil.

The forms of the invention described above are to be used as illustration only, and should not be utilized in a limiting sense in interpreting the scope of the present invention. Obvious modifications to the exemplary embodiments, as hereinabove set forth, could be readily made by those skilled in the art without departing from the spirit of the present invention.

The inventors hereby state their intent to rely on the Doctrine of Equivalents to determine and assess the reasonably fair scope of the present invention as pertains to any apparatus not materially departing from but outside the literal scope of the invention as set forth in the following claims.

The invention claimed is:

1. A header for harvesting a crop, the header comprising:
   a flexible cutterbar assembly extending lengthwise in a lateral direction relative to a normal direction of travel of the header;
   a plurality of laterally spaced apart support arms configured to support the flexible cutter bar assembly, each support arm comprising:
      a first end attached to the flexible cutterbar assembly; and
      a second end pivotal about a laterally extending axis so that the flexible cutterbar assembly is configured to flex in response to changes in terrain as the header is advanced;
   a plurality of load sensors, wherein each load sensor is located at the first end of one of the support arms and wherein each load sensor is configured to sense a force of the ground acting on the first end and generate an electronic load signal;
   a plurality of hydraulic cylinders, wherein each hydraulic cylinder is located at the second end of one of the support arms and wherein each hydraulic cylinder is actuatable to adjustably raise and lower the first end of the support arm; and a controller configured to:
  receive the electronic load signals generated by the load sensors;
  determine whether the load signals indicate that actuating one or more of the hydraulic cylinders is warranted due to a changing force of the ground acting on the first ends of one or more of the support arms; and
  if so, send a control signal to change a hydraulic pressure in the one or more hydraulic cylinders to raise or lower the first ends of the one or more support arms to offset the changing force.

2. The header of claim 1, further comprising a plurality of skid plates, wherein each skid plate is associated with the front end of one of the support arms, and wherein each load sensor is associated with one of the skid plates.

3. The header of claim 1, further comprising a hydraulic assembly comprising:
  a pressure line configured to contain a hydraulic fluid to increase the hydraulic pressure;
  a return line configured to contain the hydraulic fluid to decrease the hydraulic pressure;
  a plurality of valves coupled with the pressure line and return lines, wherein each valve is associated with one of the hydraulic cylinders, and wherein each valve is configured to open to allow the hydraulic fluid to move into or out of the hydraulic cylinder; and
  a plurality of valve lines, wherein each valve line is coupled with one of the hydraulic cylinders and one of the valves, and wherein each valve line is configured to carry the hydraulic fluid into or out of the hydraulic cylinder via the valve when the valve is open.

4. The header of claim 1, wherein the controller is configured to determine whether the changing force exceeds a pre-determined changing force value.

5. The header of claim 4, wherein the pre-determined changing force value is at least five percent.

6. The header of claim 4, wherein the pre-determined changing force value is at least ten percent.

7. The header of claim 1, wherein each of the support arms is coupled to one of the load sensors.

8. The header of claim 1, wherein only some of the support arms are coupled to one of the load sensors.

9. The header of claim 1, wherein each of the support arms is coupled to one of the hydraulic cylinders.

10. The header of claim 1, wherein only some of the support arms are coupled to one of the hydraulic cylinders.

11. The header of claim 1, wherein all of the hydraulic cylinders are actuatable by the controller.

12. The header of claim 1, wherein only some of the hydraulic cylinders are actuatable by the controller.

13. The header of claim 1, wherein the controller is configured to cause the hydraulic pressure in all of the hydraulic cylinders to be increased responsive to an electronic raise signal present for at least a pre-determined time period to raise the front ends of all of the support arms.

14. The header of claim 13, wherein the pre-determined time period is no longer than five seconds.

15. The header of claim 13, wherein the pre-determined time period is no longer than one second.

16. The header of claim 1, wherein:
  all of the support arms are provided with one of the load sensors;
  all of the support arms are provided with one of the hydraulic cylinders; and
  all of the hydraulic cylinders are actuatable by the controller.

17. A header for harvesting a crop, the header comprising:
  a flexible cutterbar assembly extending lengthwise in a lateral direction relative to a normal direction of travel of the header, wherein the flexible cutterbar is configured to be raised in response to an electronic raise signal;
  a plurality of laterally spaced apart support arms configured to support the flexible cutter bar assembly, each support arm comprising:
    a first end attached to the flexible cutterbar assembly; and
    a second end pivotal about a laterally extending axis so that the flexible cutterbar assembly is configured to flex in response to changes in terrain as the header is advanced;
  a plurality of load sensors, wherein each load sensor is located at the first end of one of the support arms and wherein each load sensor is configured to sense a force of the ground acting on the first end and generate an electronic load signal, wherein each support arm is coupled to one of the load sensors;
  a plurality of hydraulic cylinders, wherein each hydraulic cylinder is located at the second end of one of the support arms and wherein each hydraulic cylinder is actuatable to adjustably raise and lower the first end of the support arm, wherein all of the support arms are coupled to one of the hydraulic cylinders;
  a controller configured to:
    receive the electronic load signals generated by the load sensors, determine whether the load signals indicate that actuating one or more of the hydraulic cylinders is warranted due to a changing force of the ground acting on the first ends of one or more of the support arms by determining whether the changing force exceeds a pre-determined changing force value, wherein the pre-determined changing force value is at least five percent;
    if so, send a control signal to change a hydraulic pressure in the one or more hydraulic cylinders to raise or lower the first ends of the one or more support arms to offset the changing force; and
    receive the electronic raise signal and cause the hydraulic pressure in all of the hydraulic cylinders to be increased responsive to an electronic raise signal present for at least a pre-determined time period of no longer than five seconds to raise the front ends of all of the support arms.

18. A header for harvesting a crop, the header comprising:
  a frame extending in a lateral direction relative to a normal operating direction of travel of the header;
  a plurality of support arms pivotally attached to the frame at a pivot axis;
  a flexible cutterbar assembly connected to the support arms at distal ends from the pivot axis;
  a plurality of load sensors, wherein each load sensor is located at the distal end of one of the support arms and wherein each load sensor is configured to sense a force of the ground acting on the distal end and generate an electronic load signal;
  a plurality of hydraulic cylinders, wherein each hydraulic cylinder is located at an end of one of the support arms and wherein each hydraulic cylinder is actuatable to rotate the support arm about the pivot axis to raise and lower the distal end of the support arm; and
  a controller configured to:
    receive the electronic load signals generated by the load sensors; and send a control signal to change a hydraulic pressure in at least one of the hydraulic cylinders to raise or lower the distal end of at least one of the support arms responsive to the electronic load signals.

19. The header of claim 18, further comprising a plurality of skid plates, wherein each load sensor is associated with a skid plate carried by the distal end of one of the support arms.

20. The header of claim 18, wherein each support arm carries a load sensor.

* * * * *